United States Patent
Son et al.

(10) Patent No.: US 11,984,959 B2
(45) Date of Patent: May 14, 2024

(54) COMMUNICATION METHOD BASED ON CHANGE IN SHAPE OF ELECTRONIC DEVICE AND ELECTRONIC DEVICE THEREFOR

(71) Applicant: SAMSUNG ELECTRONICS CO., LTD., Suwon-si (KR)

(72) Inventors: Dongil Son, Suwon-si (KR); Chihyun Cho, Suwon-si (KR); Jaebong Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/987,253

(22) Filed: Nov. 15, 2022

(65) Prior Publication Data

US 2023/0076323 A1    Mar. 9, 2023

Related U.S. Application Data

(63) Continuation of application No. PCT/KR2021/006153, filed on May 17, 2021.

(30) Foreign Application Priority Data

May 18, 2020    (KR) ........................ 10-2020-0059161

(51) Int. Cl.
     *H04B 7/06*          (2006.01)
     *H04B 7/0413*        (2017.01)

(52) U.S. Cl.
     CPC ......... *H04B 7/0639* (2013.01); *H04B 7/0413* (2013.01)

(58) Field of Classification Search
     CPC ... H04B 7/0413; H04B 7/0639; H04B 1/3833

(Continued)

(56) References Cited

U.S. PATENT DOCUMENTS

| 7,444,175 B2 | 10/2008 | Ito et al. |
| 7,554,497 B2 | 6/2009 | Ohba et al. |

(Continued)

FOREIGN PATENT DOCUMENTS

| CN | 109216876 | 1/2019 |
| CN | 109449569 | 3/2019 |

(Continued)

OTHER PUBLICATIONS

Extended European Search Report dated Aug. 24, 2023 issued in European Patent Application No. 21808087.7.

(Continued)

*Primary Examiner* — Leila Malek
(74) *Attorney, Agent, or Firm* — Nixon & Vanderhye, P.C.

(57) ABSTRACT

An electronic device may comprise: a first cover; a second cover coupled to the first cover and configured to perform a sliding operation; a rollable display including a first display area visible in a rolled state and a second display area unrolled in response to the sliding operation of the second cover; a first antenna including a plurality of first antenna elements disposed in the first display area of the rollable display; a second antenna including a plurality of second antenna elements disposed in the second display area of the rollable display; and a processor. The processor may be configured to: form a plurality of directional beams using the first antenna based on a first beam table in a rolled state of the rollable display, and to form a plurality of directional beams using at least a part of the second antenna elements and the first antenna based on a second beam table based on the size of a visible area of the rollable display increasing from the rolled state.

15 Claims, 22 Drawing Sheets

(58) Field of Classification Search
USPC .......................................................... 375/262
See application file for complete search history.

(56) References Cited

U.S. PATENT DOCUMENTS

| | | |
|---|---|---|
| 9,786,981 B2 | 10/2017 | Mahanfar et al. |
| 10,079,425 B2 | 9/2018 | Chun et al. |
| 10,418,687 B2 | 9/2019 | Mow et al. |
| 10,615,485 B2 | 4/2020 | Chun et al. |
| 11,018,440 B2 | 5/2021 | Hong |
| 11,139,557 B2 | 10/2021 | Zhu et al. |
| 11,158,929 B2 | 10/2021 | Shi et al. |
| 2005/0143151 A1 | 6/2005 | Ito et al. |
| 2008/0211721 A1 | 9/2008 | Ohba et al. |
| 2009/0029747 A1 | 1/2009 | Ito et al. |
| 2014/0002401 A1 | 1/2014 | Cho et al. |
| 2014/0240178 A1* | 8/2014 | Chun ............... H01Q 1/243 343/702 |
| 2015/0050927 A1* | 2/2015 | Moisio ............ H04B 7/0413 455/422.1 |
| 2016/0020506 A1 | 1/2016 | Mahanfar et al. |
| 2018/0026341 A1 | 1/2018 | Mow et al. |
| 2018/0358684 A1 | 12/2018 | Chun et al. |
| 2019/0103656 A1* | 4/2019 | Shi ..................... G06F 1/1647 |
| 2020/0014095 A1 | 1/2020 | Mow et al. |
| 2020/0235459 A1 | 7/2020 | Chun et al. |
| 2021/0218137 A1 | 7/2021 | Zhu |
| 2021/0320410 A1 | 10/2021 | Liu |
| 2021/0328329 A1 | 10/2021 | Kim et al. |
| 2022/0069444 A1 | 3/2022 | Shi et al. |

FOREIGN PATENT DOCUMENTS

| | | |
|---|---|---|
| CN | 109725680 | 5/2019 |
| CN | 110351404 | 10/2019 |
| JP | 2008-72382 | 3/2008 |
| JP | 2018-82266 | 5/2018 |
| KR | 10-0702674 | 4/2007 |
| KR | 10-0737588 | 7/2007 |
| KR | 10-1078783 | 11/2018 |
| KR | 10-2019-0105732 | 9/2019 |
| KR | 10-2020-0025439 | 3/2020 |
| WO | 2020/046032 | 3/2020 |

OTHER PUBLICATIONS

European Office Action issued Feb. 16, 2024 in corresponding European Patent Application No. 21808087.7.

* cited by examiner

<1301>   <1303>

COMMUNICATION METHOD BASED ON CHANGE IN SHAPE OF ELECTRONIC DEVICE AND ELECTRONIC DEVICE THEREFOR

CROSS-REFERENCE TO RELATED APPLICATIONS

This application is a continuation of International Application No. PCT/KR2021/006153 designating the U.S., filed on May 17, 2021, in the Korean Intellectual Property Receiving Office and claiming priority to Korean Patent Application No. 10-2020-0059161, filed on May 18, 2020, in the Korean Intellectual Property Office, the disclosures of which are incorporated by reference herein in their entireties.

BACKGROUND

Field

The disclosure relates to a communication method based on a change in a form of an electronic device and an electronic device therefor.

Description of Related Art

Recently, due to a rapid increase in network traffic caused by mobile terminals, a 5th generation mobile communication (5G) technology which uses ultra-high frequency band signals has been developed. For example, a signal (e.g., mmWave) of a high frequency band (e.g., at least 24 GHz) may be used in the 5th generation mobile communication. A signal of a high frequency band may have high attenuation compared to a signal of a low frequency band. An electronic device using a signal of a high frequency band may transmit/receive signals using beamforming in order to increase coverage. For example, the electronic device may perform beamforming to maintain a line of sight (LoS) with a base station.

Furthermore, technologies for increasing the size of a display surface of a mobile terminal are developed. A form of a mobile terminal may be changed in order to improve the portability and display size of the mobile terminal. For example, research is being more actively carried out with regard to a flexible display that is mounted in a roll structure in an electronic device. The flexible display having the roll structure may extend a visually exposed display side since a rolled region is deployed in correspondence with structural deformation of the electronic device. When the electronic device communicates using beamforming, the electronic device may use a beam having a relatively sharp beam pattern. The electronic device may use a plurality of antenna arrays in order to generate beam coverage in multiple directions of the electronic device.

An antenna may be arranged at various positions in a mobile terminal in order to maintain at least a certain level of communication quality regardless of a change form of the mobile terminal. For example, the antenna may be arranged in a display of the mobile terminal. When a visually exposed area of the display of the mobile terminal changes, characteristics of the antenna arranged with the display may also change.

When a physical form of an electronic device is changed, positions of antenna arrays of the electronic device may also change according to a change in the form. In this case, due to the position change of the antenna arrays, beam coverage of the antenna arrays may also change.

SUMMARY

Embodiments of the disclosure may provide a method and an electronic device for operating a beam table according to a change in a physical form of an electronic device.

An electronic device according to an example embodiment disclosed in the present disclosure includes: a first cover, a second cover coupled with the first cover and configured to perform a sliding operation, a rollable display including a first display region visible in a rolled state and a second display region unrolled in response to the sliding operation of the second cover, a first antenna including a plurality of first antenna elements disposed in the first display region of the rollable display, a second antenna including a plurality of second antenna elements disposed in the second display region of the rollable display, and a processor, wherein the processor may be configured to: form a plurality of directional beams using the first antenna based on a first beam table in the rolled state of the rollable display, and form a plurality of directional beams using the first antenna and at least a portion of the second antenna elements based on a second beam table based on a size of a visible region of the rollable display increasing from the rolled state.

Furthermore, a method of operating an electronic device according to an example embodiment of the present disclosure includes: forming a plurality of directional beams using a first antenna based on a first beam table in a rolled state of a rollable display, and forming a plurality of directional beams using the first antenna and at least a portion of second antenna elements based on a second beam table based on a size of a visible region of the rollable display increasing from the rolled state, wherein the rollable display may include a first display region visible in the rolled state and a second display region unrolled in response to a sliding operation of a second cover, wherein the first antenna may include a plurality of first antenna elements disposed in the first display region of the rollable display, and the second antenna may include a plurality of second antenna elements disposed in the second display region of the rollable display.

According to various example embodiments of the present disclosure, an electronic device may communicate using a beam table corresponding to a change in a form of the electronic device.

According to various example embodiments of the present disclosure, an electronic device may provide adaptive beam coverage by selecting a beam table according to a change in a form of the electronic device.

According to various example embodiments of the present disclosure, a portion of an antenna of an electronic device is implemented in a portion of a display so that an assembly method and arrangement space of the electronic device may be improved and the performance of the antenna may be improved.

Besides, various effects may be provided that are directly or indirectly identified through the present disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments of the disclosure will be described in greater detail below with reference to the accompanying drawings. However, it should be understood that the disclosure is not limited to any particular embodiments, but rather includes various modifications, equivalents and/or alternatives of various example embodiments of the disclosure.

Figure 1:
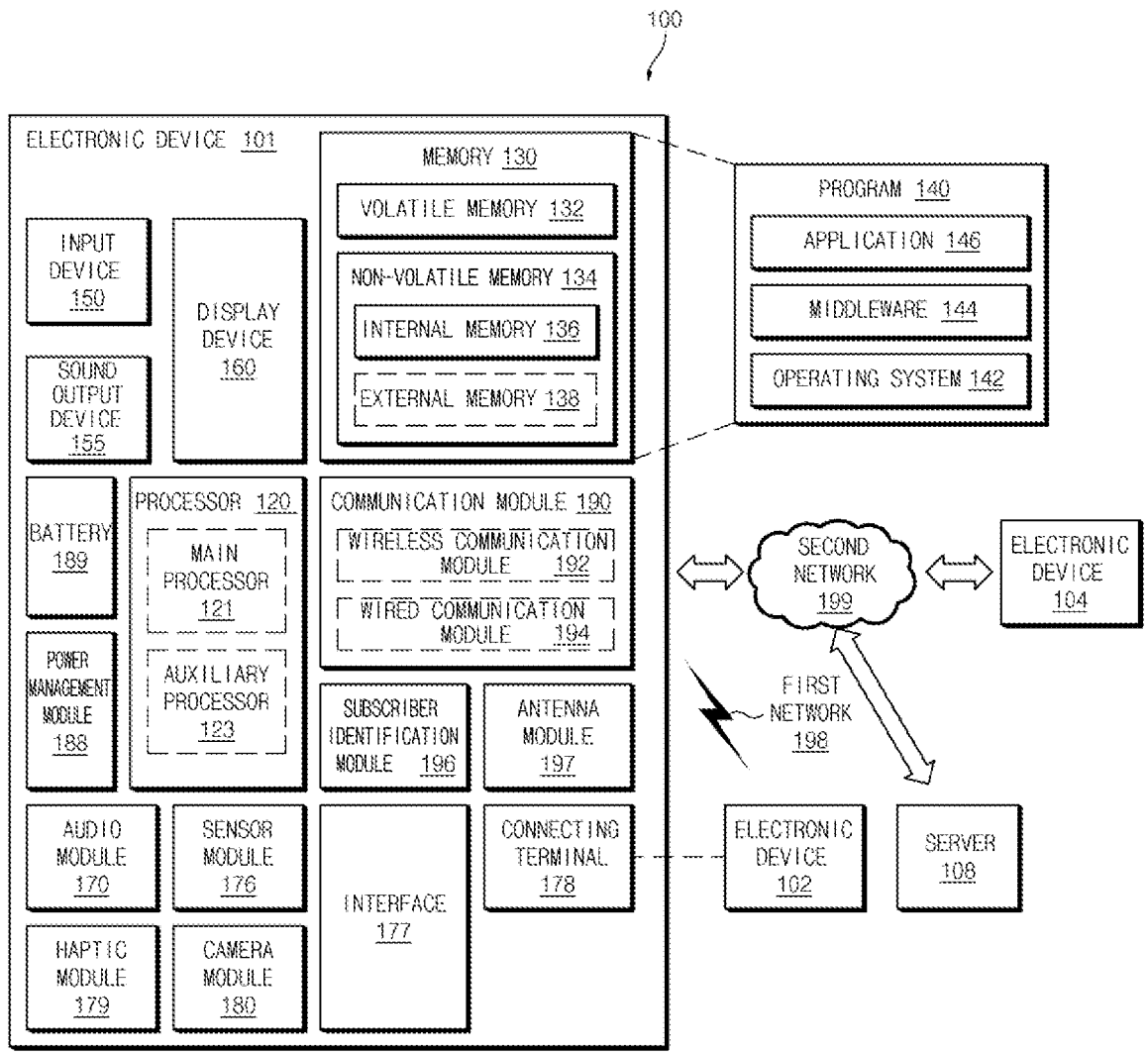
FIG. 1 is a diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
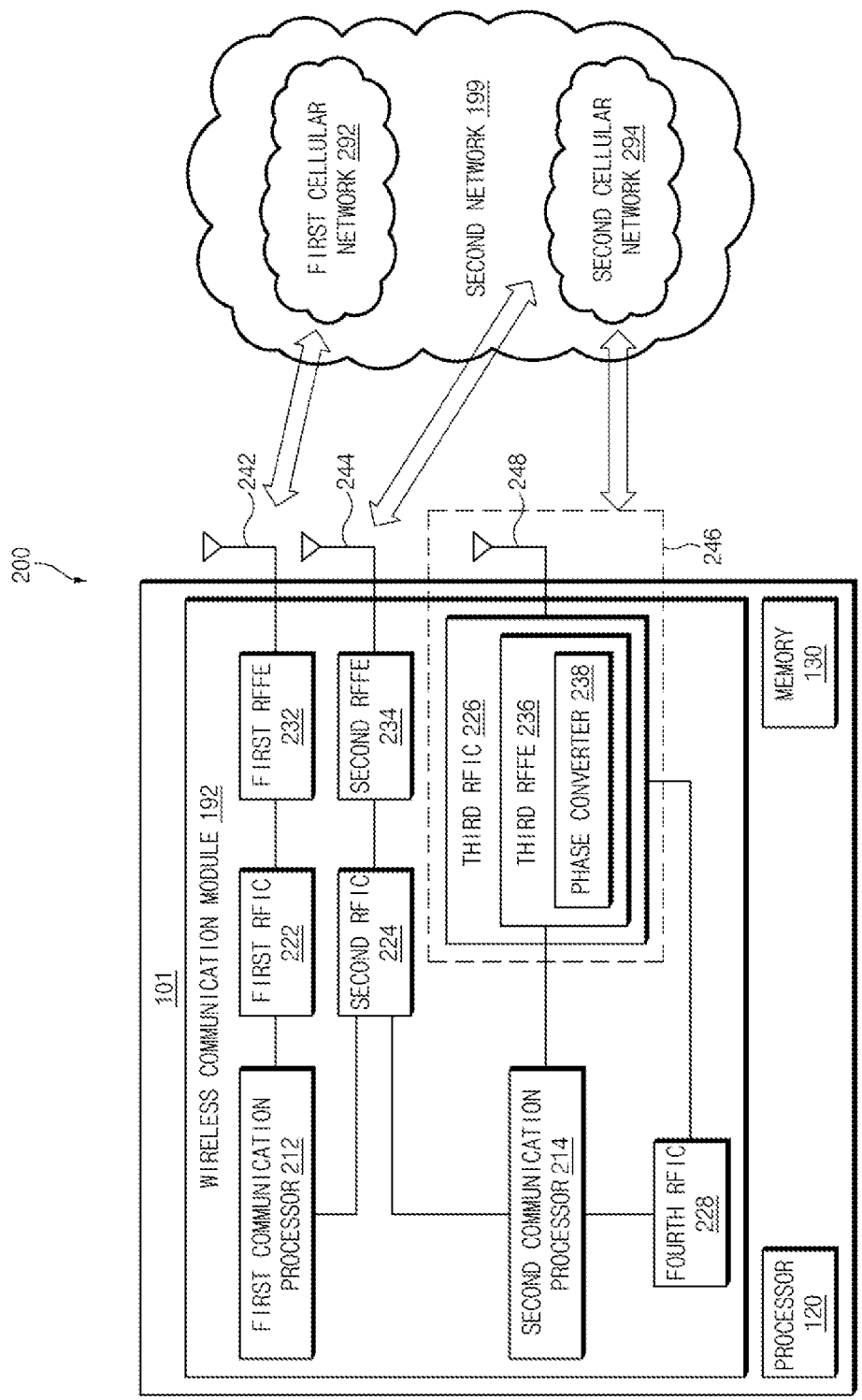
FIG. 2 is a block diagram illustrating an electronic device supporting legacy network communication and 5G network communication according to various embodiments.

FIG. 2 is a block diagram 200 illustrating an example configuration of an electronic device 101 supporting legacy network communication and 5G network communication according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a portion of the wireless communication module 192. According to an embodiment, the fourth RFIC 228 may not be provided or may be included as a portion of the third RFIC 226.

The first communication processor 212 may include various processing circuitry and support establishment of a communication channel of a band to be used for wireless communication with the first cellular network 292 and support legacy network communication through an established communication channel. According to various embodiments, the first cellular network 292 may be a legacy network including a second generation (2G), third generation (3G), fourth generation (4G), and/or long term evolution (LTE) network. The second communication processor 214 may include various processing circuitry and support establishment of a communication channel corresponding to a specified band (e.g., about 6 GHz to about 60 GHz) among bands to be used for wireless communication with the second cellular network 294 and support 5G network communication through an established communication channel. According to various embodiments, the second cellular network 294 may be a 5G network defined by the 3GPP. In addition, according to an embodiment, the first communication processor 212 or the second communication processor 214 may support establishment of a communication channel corresponding to another specified band (e.g., about 6 GHz or less) among bands to be used for wireless communication with the second cellular network 294 and support 5G network communication through an established communication channel. According to an embodiment, the first communication processor 212 and the second communication processor 214 may be implemented within a single chip or single package. According to various embodiments, the first communication processor 212 or the second communication processor 214 may be formed within a single chip or single package together with the processor 120, the auxiliary processor 123 or the communication module 190 of FIG. 1.

When performing transmission, the first RFIC 222 may convert a baseband signal generated by the first communication processor 212 into a radio frequency (RF) signal of about 700 MHz to about 3 GHz used in the first cellular network 292 (e.g., a legacy network). When performing reception, an RF signal may be obtained from the first cellular network 292 (e.g., a legacy network) via an antenna (e.g., the first antenna module 242) and may be preprocessed through an RFFE (e.g., the first RFFE 232). The first RFIC 222 may convert the preprocessed RF signal into a baseband signal so that the signal may be processed by the first communication processor 212.

When performing transmission, the second RFIC 224 may convert a baseband signal generated by the first communication processor 212 or the second communication processor 214 into an RF signal (hereinafter referred to as a 5G Sub6 RF signal) of Sub6 band (e.g., about 6 GHz or less) used in the second cellular network 294 (e.g., a 5G network). When performing reception, a 5G Sub6 RF signal may be obtained from the second cellular network 294 (e.g., a 5G network) via an antenna (e.g., the second antenna module 244) and may be preprocessed through an RFFE (e.g., the second RFFE 234). The second RFIC 224 may convert the preprocessed 5G Sub6 RF signal into a baseband signal so that the signal may be processed by a corresponding communication processor among the first communication processor 212 and the second communication processor 214.

The third RFIC 226 may convert a baseband signal generated by the second communication processor 214 into an RF signal (hereinafter referred to as a 5G Above6 RF signal) of Above6 band (e.g., about 6 GHz to about 60 GHz) to be used in the second cellular network 294 (e.g., a 5G network). When performing reception, a 5G Above6 RF signal may be obtained from the second cellular network 294 (e.g., a 5G network) via an antenna (e.g., the antenna 248) and may be preprocessed through the third RFFE 236. For example, the third RFFE 236 may preprocess a signal using a phase converter 238. The third RFIC 226 may convert the preprocessed 5G Above6 RF signal into a baseband signal so that the signal may be processed by the second communication processor 214. According to an embodiment, the third RFFE 236 may be formed as a portion of the third RFIC 226.

According to an embodiment, the electronic device 101 may include the fourth RFIC 228 separately from the third RFIC 226 or as at least a portion of the third RFIC 226. In this case, the fourth RFIC 228 may convert a baseband signal generated by the second communication processor 214 into an RF signal (hereinafter referred to as an intermediate frequency (IF) signal) of an intermediate frequency band (e.g., about 9 GHz to about 11 GHz), and then may transfer the IF signal to the third RFIC 226. The third RFIC 226 may convert the IF signal into a 5G Above6 RF signal. When performing reception, a 5G Above6 RF signal may be received from the second cellular network 294 (e.g., a 5G network) via an antenna (e.g., the antenna 248) and may be converted into an IF signal by the third RFIC 226. The fourth RFIC 228 may convert the IF signal into a baseband signal so that the signal may be processed by the second communication processor 214.

According to an embodiment, the first RFIC 222 and the second RFIC 224 may be implemented as at least a portion of a single chip or single package. According to an embodiment, the first RFFE 232 and the second RFFE 234 may be implemented as at least a portion of a single chip or single package. According to an embodiment, at least one antenna module among the first antenna module 242 and the second antenna module 244 may not be provided or may be combined with another antenna module to process RF signals of a plurality of corresponding bands.

According to an embodiment, the third RFIC 226 and the antenna 248 may be arranged on the same substrate to form the third antenna module 246. For example, the wireless communication module 192 or the processor 120 may be arranged on a first substrate (e.g., main PCB). In this case, the third RFIC 226 may be arranged in a partial region (e.g., lower surface) of a second substrate (e.g., sub PCB) that is separate from the first substrate and the antenna 248 may be arranged in another partial region (e.g., upper surface) to form the third antenna module 246. According to an embodiment, the antenna 248 may include, for example, an antenna array that may be used for beamforming. It is possible to decrease a length of a transmission line between the third RFIC 226 and the antenna 248 by arranging the third RFIC 226 and the antenna 248 on the same substrate. This configuration, for example, may reduce loss (e.g., attenuation), caused by the transmission line, of a signal of a high frequency band (e.g., about 6 GHz to about 60 GHz) used in 5G network communication. Accordingly, the electronic device 101 may improve quality or speed of communication with the second cellular network 294 (e.g., a 5G network).

The second network 294 (e.g., a 5G network) may operate independent of the first cellular network 292 (e.g., a legacy network) (e.g., Stand-Alone (SA)) or may operate by being connected thereto (e.g., Non-Stand Alone (NSA)). For example, a 5G network may include only an access network (e.g., 5G radio access network(RAN) or next generation RAN (NG RAN)), and may not have a core network (e.g., next generation core (NGC)). In this case, the electronic device 101 may access an external network (e.g., the Internet) by being controlled by a core network (e.g., evolved packed core (EPC)) of a legacy network after accessing the access network of the 5G network. Protocol information (e.g., LTE protocol information) for communicating with a legacy network or protocol information (e.g., New Radio (NR)) for communicating with a 5G network may be stored in the memory 130, and may be accessed by other components (e.g., the processor 120, the first communication processor 212, or the second communication processor 214).

Figure 3:
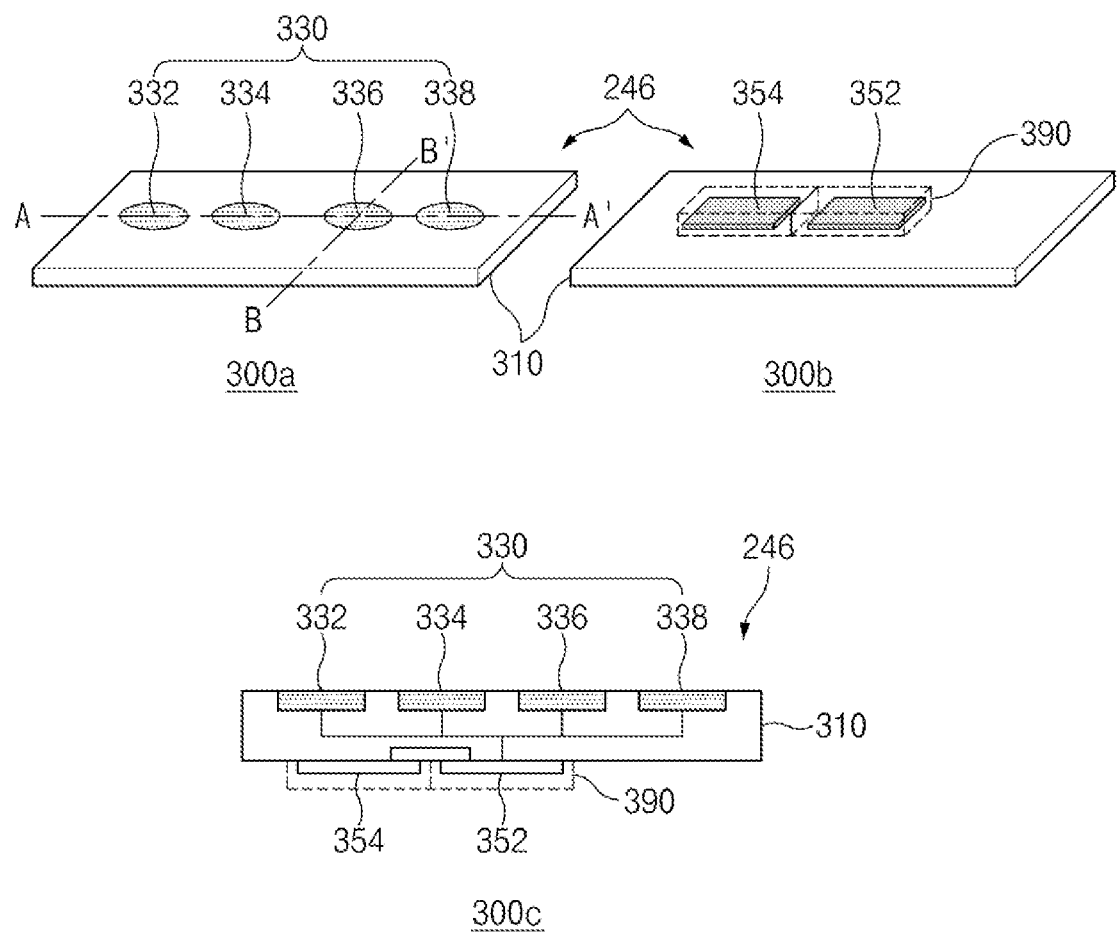
FIG. 3 is a perspective and cross-sectional view illustrating an example structure of the third antenna module described with reference to FIG. 2 according to various embodiments.

FIG. 3 is a perspective and cross-sectional view illustrating an example structure of the third antenna module 246 described with reference to FIG. 2 according to various embodiments.

300a of FIG. 3 is a perspective view of the third antenna module 246 as viewed from one side, and 300b of FIG. 3 is a perspective view of the third antenna module 246 as viewed from another side. 300c of FIG. 3 is a cross-sectional view of the third antenna module 246 taken along line A-A'.

Referring to FIG. 3, in an embodiment, the third antenna module 246 may include a printed circuit board 310, an antenna array 330, a radio frequency integrated circuit (RFIC) 352, a power management integrate circuit (PMIC) 354, and a module interface (not shown). Optionally, the third antenna module 246 may further include a shielding member 390. In other embodiments, at least one of the above-mentioned components may not be provided, or at least two of the above-mentioned components may be integrated.

The printed circuit board 310 may include a plurality of conductive layers and a plurality of non-conductive layers stacked alternately with the conductive layers. The printed circuit board 310 may provide an electric connection between the printed circuit board 310 and/or externally arranged various electronic components using lines and conductive vias formed in the conductive layers.

The antenna array 330 (e.g., 248 of FIG. 2) may include a plurality of antenna elements 332, 334, 336, and/or 338 arranged to form a directional beam. The antenna elements may be formed on a first face of the printed circuit board 310 as illustrated in the figure. According to an embodiment, the antenna array 330 may be formed inside the printed circuit board 310. According to embodiments, the antenna array 330 may include a plurality of antenna arrays (e.g., a dipole antenna array and/or a patch antenna array) of the same shape or type or different shapes or types. According to various embodiments, the plurality of antenna elements 332, 334, 336, or 338 may be a plurality of conductive plates or a plurality of conductive members.

The RFIC 352 (e.g., the third RFIC 226 of FIG. 2) may be arranged in another region (e.g., a second face opposite to the first face) of the printed circuit board 310 spaced apart from the antenna array 330. The RFIC 352 may be configured to process a signal of a selected frequency band, which is transmitted/received through the antenna array 330. According to an embodiment, when performing transmission, the RFIC 352 may convert a baseband signal obtained from a communication processor (not shown) into an RF signal of a specified band. When performing reception, the RFIC 352 may convert an RF signal received via the antenna array 330 into a baseband signal and may transfer the baseband signal to the communication processor.

According to an embodiment, when performing transmission, the RFIC 352 may up-convert an IF signal (e.g., about 9 GHz to about 11 GHz) obtained from an intermediate frequency integrate circuit (IFIC) (e.g., the fourth RFIC 228 of FIG. 2) into an RF signal of a selected band. When performing reception, the RFIC 352 may down-convert an RF signal obtained via the antenna array 330 into an IF signal and may transfer the IF signal to the IFIC.

The PMIC 354 may be arranged in another partial region (e.g., the second face) of the printed circuit board 310 spaced apart from the antenna array. The PMIC 354 may be supplied with power from a main PCB (not shown) and may supply power to various components (e.g., the RFIC 352) on an antenna module.

The shielding member 390 may be arranged on a portion (e.g., the second face) of the printed circuit board 310 to electromagnetically shield at least one of the RFIC 352 or the PMIC 354. According to an embodiment, the shielding member 390 may include a shield can.

Although not illustrated, in various embodiments, the third antenna module 246 may be electrically connected to another printed circuit board (e.g., a main circuit board) via a module interface. The module interface may include a connection member, for example, a coaxial cable connector, a board-to-board connector, interposer, or a flexible printed circuit board (FPCB). The RFIC 352 and/or the PMIC 354 of the third antenna module 246 may be electrically connected to the printed circuit board via the connection member.

Figure 4:
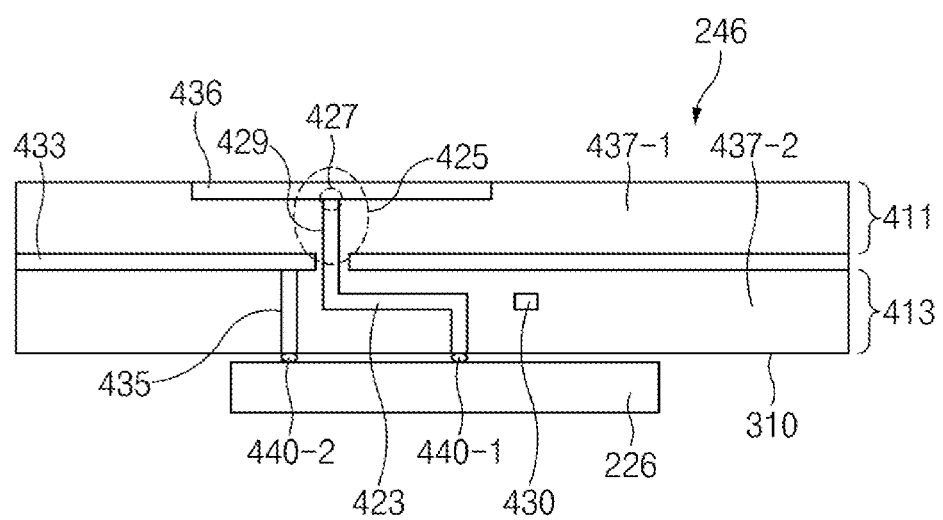
FIG. 4 is a cross-sectional vie of the third antenna module of FIG. 3 taken along line B-B' according to various embodiments.

FIG. 4 is a cross-sectional view illustrating the third antenna module 246 of 300a of FIG. 3 taken along line B-B' according to various embodiments.

The printed circuit board 310 of the illustrated embodiment may include an antenna layer 411 and a network layer 413.

The antenna layer 411 may include at least one dielectric layer 437-1 and an antenna element 336 and/or feeding portion 425 formed on an external surface of the dielectric layer or formed therein. The feeding portion 425 may include a feeding point 427 and/or a feeding line 429.

The network layer 413 may include at least one dielectric layer 437-2 and at least one ground layer 433, at least one conductive via 435, transmission line 423, and/or signal line 430 formed on an external surface of the dielectric layer or formed therein.

In addition, in the illustrated embodiment, the third RFIC 226 may be electrically connected to the network layer 413 via, for example, first and second connection portions (solder bumps) 440-1 and 440-2. In other embodiments, various connection structures (e.g., solder or ball grid array (BGA)) may be used instead of the connection portions. The third RFIC 226 may be electrically connected to the antenna element 336 via the first connection portion 440-1, the transmission line 423, and the feeding portion 425. Furthermore, the third RFIC 226 may be electrically connected to the ground layer 433 via the second connection portion 440-2 and the conductive via 435. Although not illustrated, the third RFIC 226 may be electrically connected to the above-mentioned module interface via the signal line 430.

Figure 5:
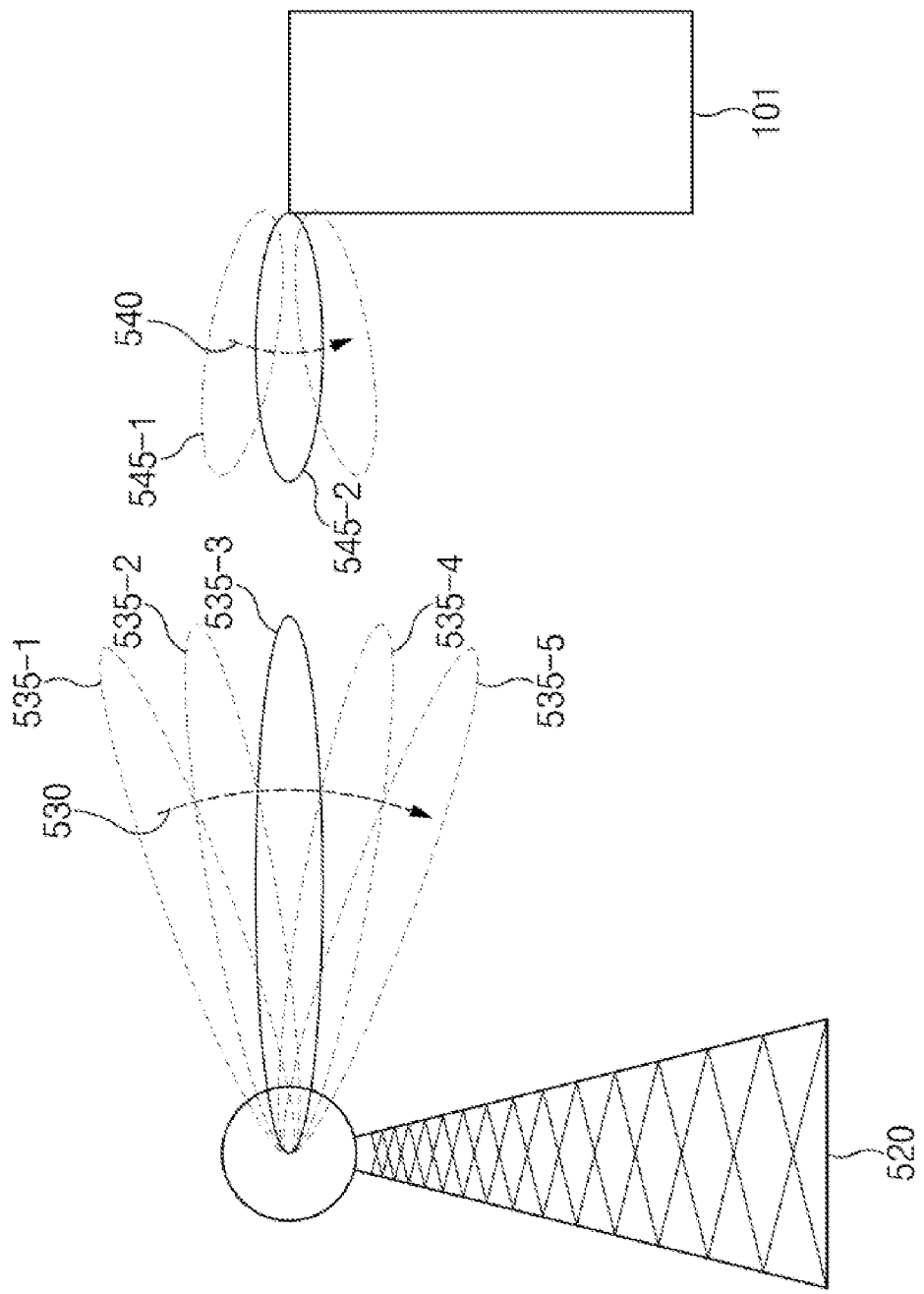
FIG. 5 is a diagram illustrating example operation for wireless communication connection between a base station and an electronic device in the second network (e.g., 5G network) of FIG. 2, in which a directional beam is used for wireless connection according to various embodiments.

FIG. 5 is a diagram illustrating an example operation of a wireless communication connection between a base station 520 and the electronic device 101 in the second cellular network 294 (e.g., 5G network) of FIG. 2, in which a directional beam is used for wireless connection according to various embodiments.

The base station (gNodeB (gNB), transmission reception point (TRP)) 520 may perform beam detection with the electronic device 101 for the wireless communication connection. In the illustrated embodiment, for the beam detection, the base station 520 may perform transmission beam sweeping 530 at least one time by sequentially transmitting a plurality of transmission beams, for example, first to fifth transmission beams 535-1, 535-2, 535-3, 535-4 and 535-5 (which may be referred to as 535-1-535-5) having different directions.

The first to fifth transmission beams 535-1 to 535-5 may include at least one synchronization sequences(SS)/physical broadcast channel(PBCH) block. The SS/PBCH block may be used to periodically measure a channel of the electronic device 101 or beam intensity.

In an embodiment, the first to fifth transmission beams 535-1 to 535-5 may include at least one channel state information-reference signal (CSI-RS). The CSI-RS may be a criterion/reference signal that may be flexibly configured by the base station 520, and may be transmitted periodically, semi-persistently, or aperiodically. The electronic device 101 may measure a channel and beam intensity using the CSI-RS.

The transmission beams may form a radiation pattern having a selected beam width. For example, the transmission beams may have a broad radiation pattern having a first beam width or a sharp radiation pattern having a second beam width that is smaller than the first beam width. For example, transmission beams including an SS/PBCH block may have a broader radiation pattern than transmission beams including a CSI-RS.

The electronic device 101 may perform reception beam sweeping 540 while the base station 520 is performing the transmission beam sweeping 530. For example, while the base station 520 is performing first transmission beam sweeping 530, the electronic device 101 may fix a first reception beam 545-1 in a first direction and may receive a signal of SS/PBCH block transmitted from at least one of the first to fifth transmission beams 535-1 to 535-5. While the base station 520 is performing second transmission beam sweeping 530, the electronic device 101 may fix a second reception beam 545-2 in a second direction and may receive a signal of SS/PBCH block transmitted from the first to fifth transmission beams 535-1 to 535-5. As described above, the electronic device 101 may select a communicable reception beam (e.g., the second reception beam 545-2) and transmission beam (e.g., the third transmission beam 535-3) based on a result of signal reception operation through the reception beam sweeping 540.

As described above, after the communicable transmission/reception beams are determined, the base station 520 and the electronic device 101 may transmit and/or receive pieces of basic information for configuring a cell and may configure additional information for beam operation based on the basic information. For example, the beam operation information may include detailed information about a configured beam and configuration information about an SS/PBCH block, CSI-RS, or additional reference signal.

Furthermore, the electronic device 101 may continuously monitor a channel and beam intensity using at least one of SS/PBCH block or CSI-RS included in a transmission beam. The electronic device 101 may adaptively select a beam with good quality using the above monitoring operation. Optionally, when communication is disconnected due to movement of the electronic device 101 or beam interruption, the above beam sweeping operation may be re-performed to determine a communicable beam.

Figure 6:
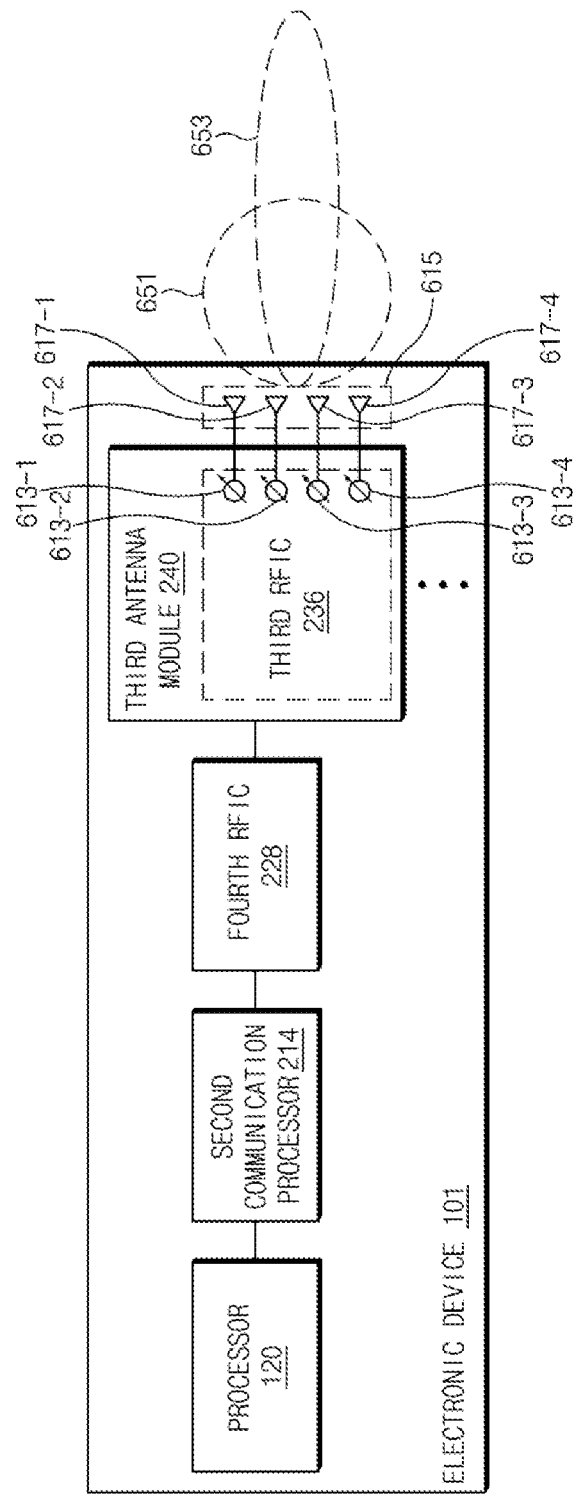
FIG. 6 is a block diagram illustrating an example configuration of an electronic device for 5G network communication according to various embodiments.

FIG. 6 is a block diagram illustrating an example configuration of the electronic device 101 for 5G network communication according to various embodiments.

The electronic device 101 may include various components shown in FIG. 3, but, for concise description, FIG. 6 illustrates the electronic device 101 as including a processor (e.g., including processing circuitry) 120, a second communication processor (e.g., including processing circuitry) 214, a fourth RFIC 228, and at least one third antenna module (e.g., including at least one antenna) 246.

In the illustrated embodiment, the third antenna module 246 may include first to fourth phase converters 613-1, 613-2, 613-3 and 613-4 (which may be referred to as phase converters 613-1 to 613-4) (e.g., the phase converter 238 of FIG. 2) and/or first to fourth antenna elements 617-1, 627-2, 617-3 and 617-4 (which may be referred to as antenna elements 617-1 to 617-4) (e.g., the antenna 248 of FIG. 2). Each one of the first to fourth antenna elements 617-1 to 617-4 may be electrically connected to an individual one of the first to fourth phase converters 613-1 to 613-4. The first to fourth antenna elements 617-1 to 617-4 may form at least one antenna array 615.

The second communication processor 214 may control a phase of signals transmitted and/or received through the first to fourth antenna elements 617-1 to 617-4 by controlling the first to fourth phase converters 613-1 to 613-4, and may generate a transmission beam and/or reception beam in a direction selected accordingly.

According to an embodiment, the third antenna module 246 may generate a beam 651 having a wide radiation pattern (hereinafter referred to as a "wide beam") or a beam 653 having a sharp radiation pattern (hereinafter referred to as a "sharp beam") according to the number of antenna elements used. For example, the third antenna module 246 may form the sharp beam 653 when using all of the first to fourth antenna elements 617-1 to 617-4, and may form the wide beam 651 when using only the first antenna element 617-1 and the second antenna element 617-2. The wide beam 651 has wider coverage than the sharp beam 653 but has a lower antenna gain, and thus may be more effective when performing a beam search. On the contrary, the sharp beam 653 has narrower coverage than the wide beam 651 but has a higher antenna gain, and thus may improve communication performance.

According to an embodiment, the second communication processor 214 may use the sensor module 176 (e.g., 9-axis sensor, grip sensor, or GPS) in a beam search. For example, the electronic device 101 may use the sensor module 176 to adjust a beam search position and/or beam search period based on a position and/or movement of the electronic device 101. For another example, when the electronic device 101 is gripped by a user, a grip sensor may be used to detect a portion gripped by the user and select an antenna module having better communication performance among a plurality of third antenna modules 246.

Figure 7A:
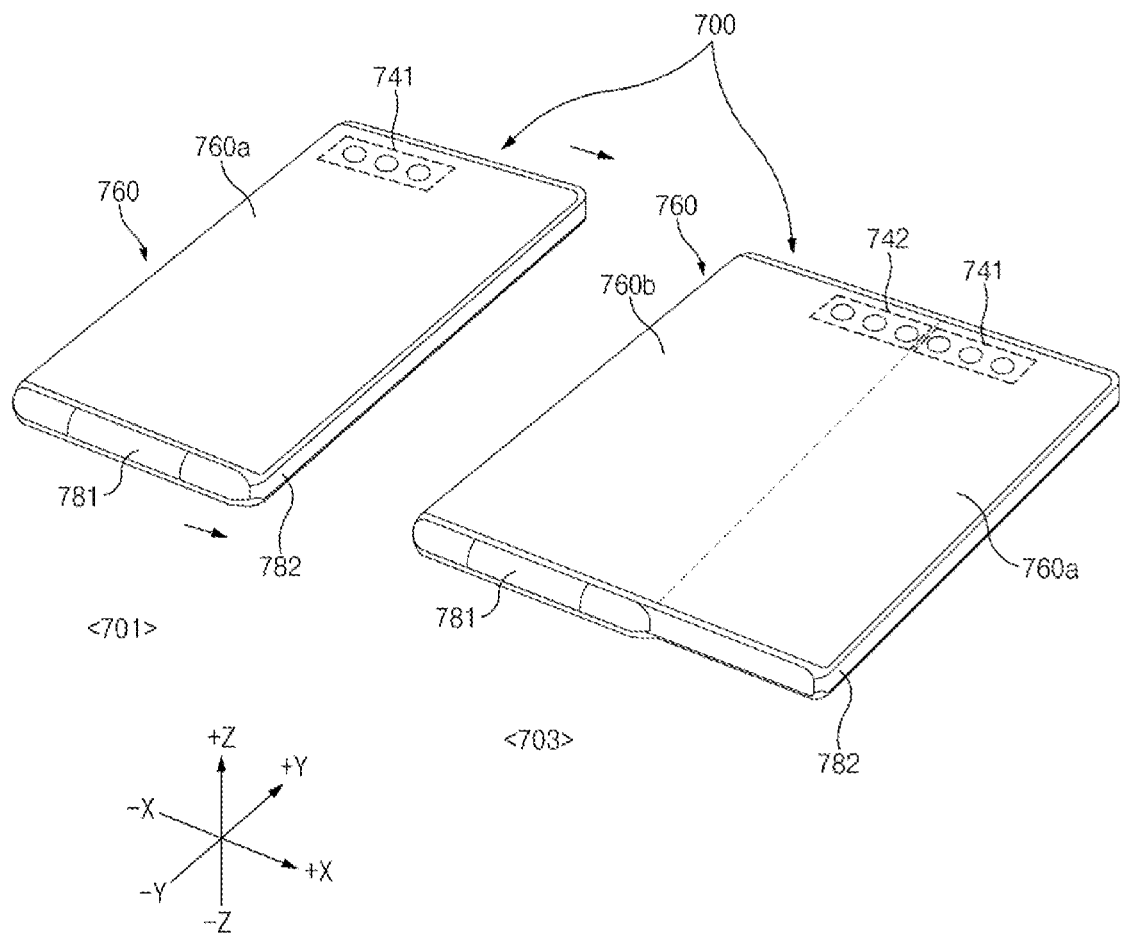
FIG. 7A is a perspective view illustrating an example of an electronic device according to various embodiments.

FIG. 7A is a perspective view illustrating an example of an electronic device according to various embodiments.

Referring to FIG. 7A, an electronic device 700 (e.g., the electronic device 101 of FIG. 1) according to an embodiment may include a display 760 (e.g., the display device 160 of FIG. 1), a first cover 781, a second cover 782, a first antenna 741, and/or a second antenna 742.

The display 760 (e.g., the display device 160 of FIG. 1) may visually provide information to the outside (e.g., a user) of the electronic device 700. The display 760 of the present disclosure may be construed as a rollable display that is bendable. For example, as a form of the electronic device 700 changes when the user manipulates the electronic device 700, at least a portion of the display 760 may be rolled into an edge of one side (e.g., −X axis direction) of the electronic device 700 or may be unrolled from the edge of one side.

The first cover 781 may serve as a fixing cover to which one side of the display 760 is fixed. The second cover 782 may be moved in a +X axis direction or −X axis direction with respect to the first cover 781. The user may manipulate the form of the electronic device 700 by moving the second cover 782. For example, a state in which the second cover 782 has slid in the −X axis direction and a contact area between the first cover 781 and the second cover 782 is maximum may be referred to as a rolled state 701 (e.g., ROLL state). For another example, a state in which the second cover 782 has slid in the +X axis direction and the contact area between the first cover 781 and the second cover 782 is minimum may be referred to as first state 703 (e.g., EXPAND state). For another example, the user may deform the electronic device 700 into a second state (not shown) rather than the rolled state 701 and the first state 703 by moving the second cover 782. The second state may be referred to any state that may occur when the electronic device 700 is deformed from the rolled state 701 to the first state 703.

According to an embodiment, a size of a display region which is visually exposed (e.g., visible) on a front side (+Z axis direction) of the electronic device 700 may vary according to a form change of the electronic device 700. The display 760 may be divided into a first display region 760a and a second display region 760b. For example, when the electronic device 700 is in the rolled state 701, the first display region 760a may be visually exposed on the front side of the electronic device 700. The second display region 760b may be rolled into one side (edge of the electronic device 700 in the −X axis direction) of the electronic device 700 and disposed toward a lateral side (−X axis direction) and/or rear side (−Z axis direction). In this case, the second display region 760b may be covered with the first cover 781 and at least a portion of the second cover 782. For example, when the electronic device 700 is in the first state 703 (e.g., EXPAND state), the first display region 760a and the second display region 760b both may be visually exposed on the front side of the electronic device 700. For another example, when the electronic device 700 is in a partially extended (e.g., second) state, the first display region 760a may be visually exposed on the front side of the electronic device 700, but the second display region 760b may be only partially exposed (e.g., visible) on the front side of the electronic device 700 and another portion may be rolled into one side of the electronic device 700 and disposed toward a lateral side (−X axis direction) and/or rear side (−Z axis direction).

According to an embodiment, the first antenna 741 (e.g., the antenna array 615 of FIG. 6) and the second antenna 742 (e.g., the antenna module 246 of FIG. 2) may be arranged inside the display 760. The first antenna 741 may include a plurality of first antenna elements (e.g., the antenna elements 332, 334, 336, or 338 of FIG. 3), and may be arranged in the first display region 760a of the rollable display 760. The second antenna 742 may include a plurality of second antenna elements (e.g., the antenna elements 332, 334, 336, or 338 of FIG. 3), and may be arranged in the second display region 760b of the rollable display 760. A laminate structure of the display 760 in which the first antenna 741 and the second antenna 742 are arranged will be described with reference to FIGS. 10A to 10C. The first antenna 741 and the second antenna 742 may move with the display as the form of the electronic device 700 changes. For example, in the rolled state 701, the first antenna 741 may be disposed toward the front side of the electronic device 700. The second antenna 742 may be disposed toward a lateral side (−X axis direction) and/or rear side (−Z axis direction). For another example, in the first state 703, the first antenna 741 may be moved in the +X axis direction in comparison with the rolled state 701 and may be disposed toward the front side of the electronic device 700. The second antenna 742 may be disposed toward the front side of the electronic device 700 at a position spaced apart from the first antenna 741 in the −X axis direction. The antenna positions and the number of antenna elements included in the antennas of FIG. 7A are illustrative, and embodiments of the present disclosure are not limited thereto.

According to an embodiment, when the first antenna 741 and the second antenna 742 are used as one array antenna in the first state 703, a distance between the first antenna 741 and the second antenna 742 may be designed to be substantially the same as a distance between the plurality of first antenna elements and a distance between the plurality of second antenna elements.

According to an embodiment, the first antenna 741 (e.g., the antenna array 615 of FIG. 6) and the second antenna 742 (e.g., the antenna module 246 of FIG. 2) may be mounted in at least one conductive layer included in a laminate structure of layers of the display 760.

Various electronic elements related to operation of the display 760, electronic elements (e.g., processor, memory, power management module, sensor module) related to various user functions supported by the electronic device 101, or a battery, roller, and rail structure may be arranged inside the first cover 781 and the second cover 782.

Figure 7B:
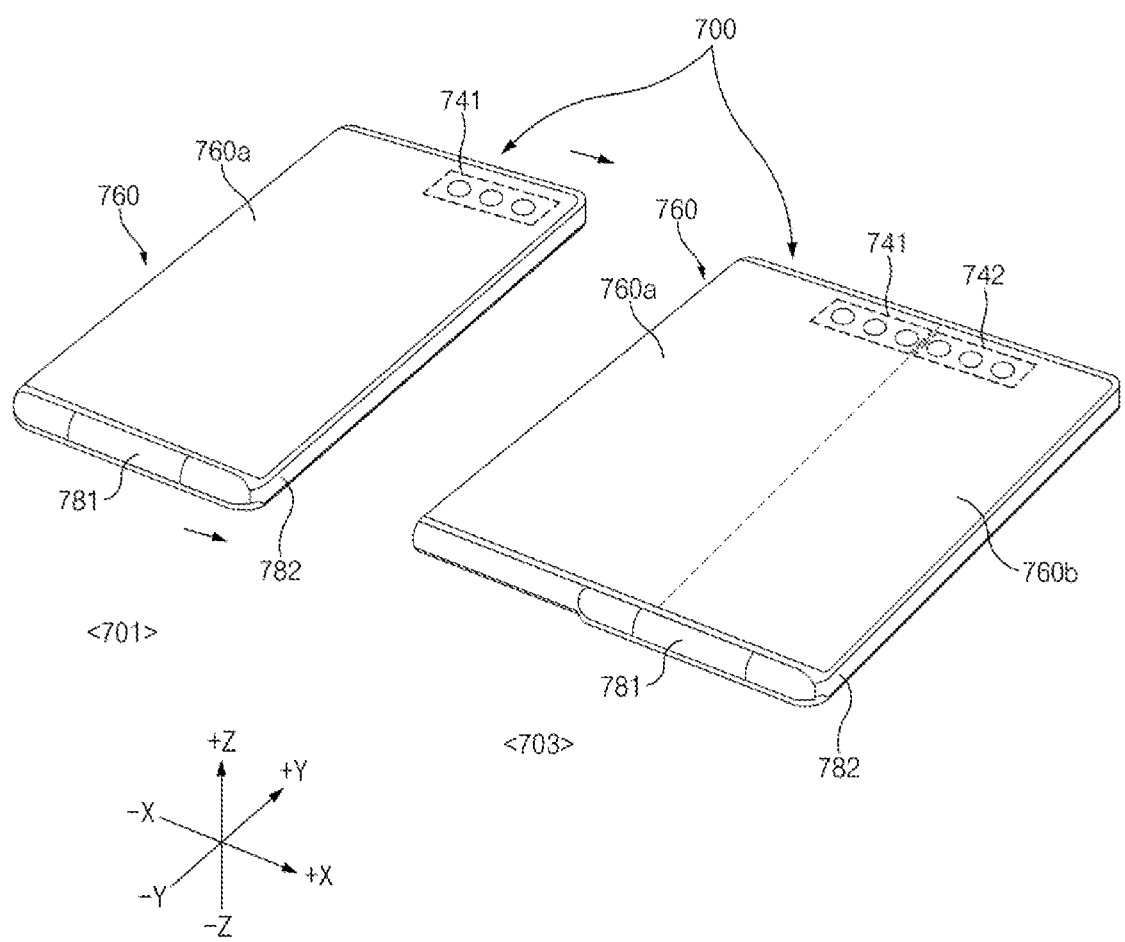
FIG. 7B is a perspective view illustrating an example of an electronic device according to various embodiments.

FIG. 7B is a perspective view illustrating an example of an electronic device according to various embodiments.

The descriptions provided with reference to FIG. 7A may be referenced for configurations corresponding to the reference numbers in FIG. 7A among the reference numbers in FIG. 7B. Hereinafter, the electronic device 700 of FIG. 7B will be described with a focus on differences with the electronic device 700 of FIG. 7A. Regarding the example of FIG. 7A, it has been described that the display 760 is unrolled from a left side (side in the −X axis direction) of the electronic device 700, but embodiments of the present disclosure are not limited thereto. For example, in the example of FIG. 7B, the display 760 may be unrolled from a right side (side in the +X axis direction) of the electronic device 700.

According to an embodiment, a size of a display region which is visually exposed (e.g., visible) on a front side (+Z axis direction) of the electronic device 700 may vary according to a form change of the electronic device 700. For example, when the electronic device 700 is in the rolled state 701, the first display region 760*a* may be visually exposed on the front side of the electronic device 700. The second display region 760*b* may be rolled into one side (edge of the electronic device 700 in the +X axis direction) of the electronic device 700 and disposed toward a lateral side (+X axis direction) and/or rear side (−Z axis direction). In this case, the second display region 760*b* may be covered with the first cover 781 and at least a portion of the second cover 782. For example, when the electronic device 700 is in the first state 703 (e.g., EXPAND state), the first display region 760*a* and the second display region 760*b* both may be visually exposed on the front side of the electronic device 700. For another example, when the electronic device 700 is in the second state, the first display region 760*a* may be visually exposed on the front side of the electronic device 700, but the second display region 760*b* may be only partially exposed on the front side of the electronic device 700 and another portion may be rolled into one side of the electronic device 700 and disposed toward a lateral side (+X axis direction) and/or rear side (−Z axis direction).

According to an embodiment, in the rolled state 701, the first antenna 741 may be disposed toward the front side of the electronic device 700. The second antenna 742 may be disposed toward a lateral side (+X axis direction) and/or rear side (−Z axis direction) of the electronic device 700. In the first state 703, the first antenna 741 may be disposed at the same position as that in the rolled state 701. The second antenna 742 may be disposed toward the front side of the electronic device 700 at a position spaced apart from the first antenna 741 in the +X axis direction.

Hereinafter, for convenience, it may be assumed that the form of the electronic device 700 changes as illustrated in FIG. 7A.

Figure 8:
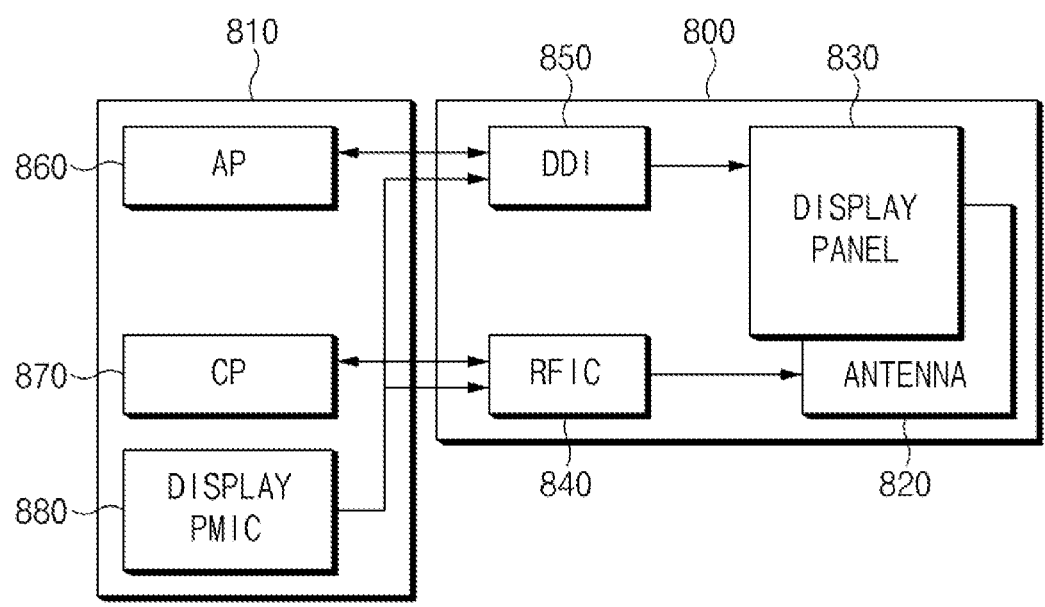
FIG. 8 is a block diagram illustrating an example configuration of a connection structure between a display module unit and a main circuit board according to various embodiments.

FIG. 8 is a block diagram illustrating an example configuration of a connection structure between a display module unit and a main circuit board according to various embodiments.

According to an embodiment, a main circuit board 810 may include an AP (e.g., including processing circuitry) 860, a CP (e.g., including processing circuitry) 870, and/or a display PMIC 880. A display module unit 800 may include an antenna 820, a display panel 830, an RFIC 840, and a DDI 850. The configuration in FIG. 8 is illustrative, and embodiments of the present disclosure are not limited thereto. For example, the main circuit board 810 may further include a battery (e.g., 189 of FIG. 1). The main circuit board 810 may be electrically connected to the display module unit 800 via a connector (not shown).

The AP 860 (e.g., the main processor 121 of FIG. 1) may include various processing circuitry and connect image data generated in a GPU (e.g., the auxiliary processor 123 of FIG. 1) and a control signal of the display module unit 800. The CP 870 (e.g., the auxiliary processor 123 of FIG. 1) may connect a signal of an intermediate frequency band generated in a modem and a control signal of the RFIC 840. The CP 870 may be implemented separately from the AP 860 or may be implemented on a single chip with the AP 860. The display PMIC 880 may supply power to the DDI 850 and the RFIC 840. The connector may be designed by separating pin positions of signal lines from each other in order to reduce noise between connection signals, or a shielding structure may be applied for each connection module. For example, the display PMIC 880 may be a PMIC (e.g., the power management module 188 of FIG. 1) of a processor (e.g., the processor 120 of FIG. 1).

The DDI (display driver IC) 850, for example, may receive image data or image information including an image control signal corresponding to an instruction for controlling the image data from another component (e.g., the AP 860) of an electronic device. The DDI 850 may process the received image information so as to display visual information corresponding to the image data through the display panel 830.

The display panel 760 may be configured with a plurality of layers of an electronic device (e.g., 700 of FIG. 7A). The plurality of layers may be designed as a laminate structure. The antenna 820 (e.g., the first antenna 741 and second antenna 742 of FIG. 7A) may be disposed between laminate structures of layers of the display panel 760 or one surface of the laminate structures. For example, the antenna 820 may be disposed as one layer of the display panel 830. The laminate structure of the display panel 760 will be described in detail with reference to FIGS. 10A to 10C. The antenna 820 may be electrically connected to the RFIC 840 to transmit/receive signals.

According to an embodiment, the RFIC 840 may convert a signal of a processor (e.g., the CP 870) into a signal of a high frequency band and may externally transmit the signal of a high frequency band using the antenna 820. For another example, the RFIC 840 may receive a signal of a high frequency band via the antenna 820 and may convert the received signal into a signal processable by a processor (e.g., the CP 870).

According to an embodiment, the display module unit 800 may be designed on one flexible printed circuit board (FPCB). The FPCB may include a plurality of connection lines (e.g., connector), wherein at least one connection line may be used to transfer a display signal and another connection line may be used to transfer a communication signal.

Figure 9A:
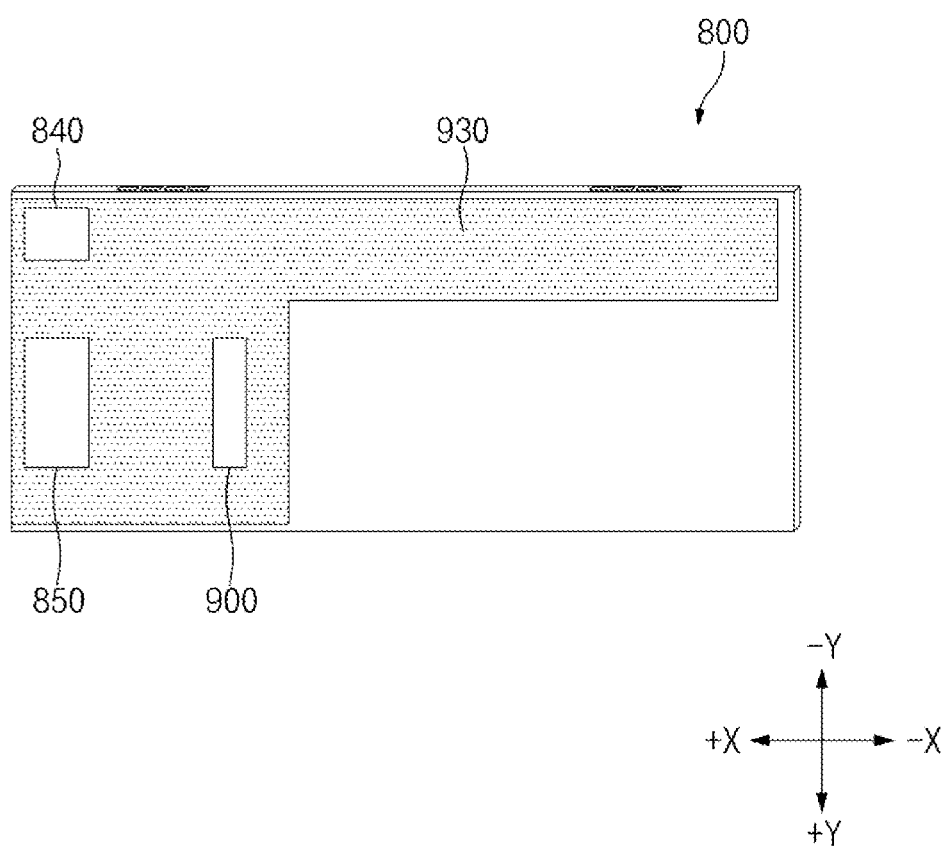
FIGS. 9A and 9B are diagrams illustrating an example structure of a display module unit of an electronic device according to various embodiments.
Figure 9B:
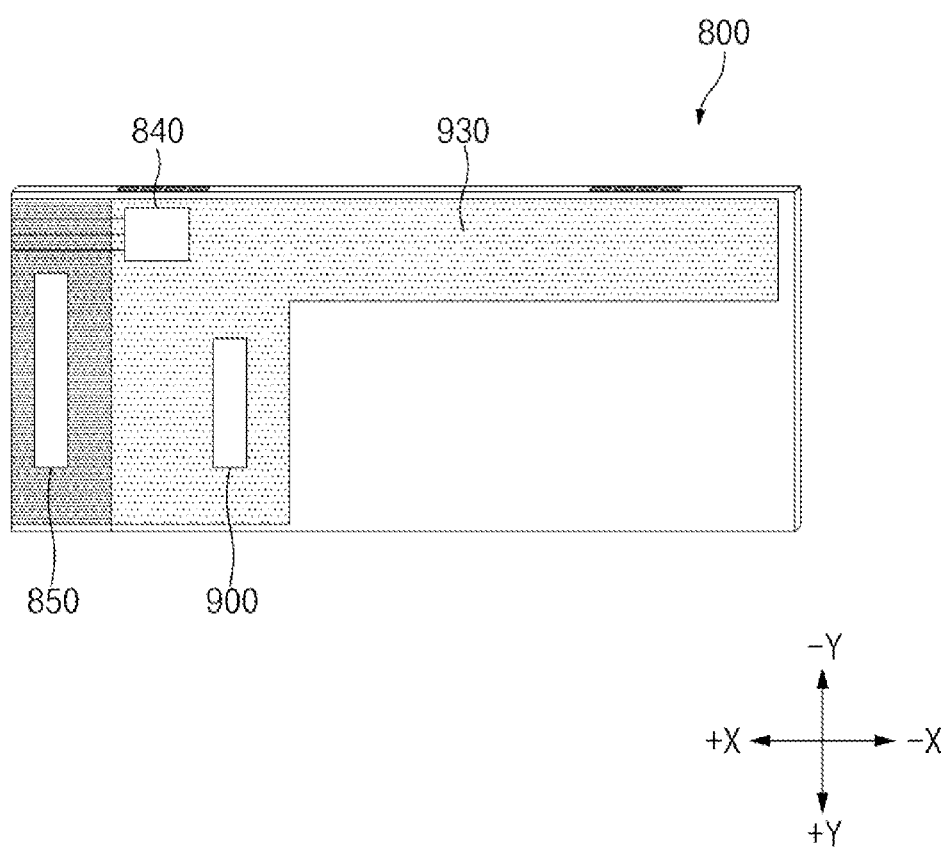

FIGS. 9A and 9B are diagrams illustrating an example structure of a display module unit of an electronic device according to various embodiments.

FIGS. 9A and 9B illustrate the display module unit 800 when the electronic device 700 is in a first state (e.g., 701 of FIG. 7A) and a second state (e.g., 703 of FIG. 7A), respectively. The descriptions provided with reference to FIGS. 1 to 8 may be referenced for configurations corresponding to the reference numbers in FIGS. 1 to 8 among the reference numbers in FIGS. 9A and 9B.

Referring to FIG. 9A, the display module unit 800 may include an FPCB 930 and connector 900 connected to a display panel (e.g., 830 of FIG. 8). The FPCB 930 may include at least one DDI (e.g., 850 of FIG. 8) and an RFIC (e.g., 840 of FIG. 8). The display module unit 800 may be electrically connected to a main circuit board (e.g., 810 of FIG. 8) via the connector 900. The display module unit 800 may further include an additional connector for connecting the main circuit board 810 and the RFIC 840 to transfer a signal. An antenna (e.g., 741 and 742 of FIG. 7A) may be disposed between laminate structures of the display panel. A communication line of the RFIC 840 may be bent and extend to a lateral side (e.g., +X axis direction) of the electronic device 700. The communication line of the RFIC 840 may be formed on the FPCB 930. The RFIC 840 may be electrically connected via the communication line to an antenna layer or antenna module (e.g., the first antenna 741 and the second antenna 742 of FIG. 7A) positioned in the first display region 760A.

Referring to FIG. 9B, the display panel 830 may extend to a lateral side (e.g., +X axis direction) of the electronic device 700 and may be bent. For example, a layer 950 including polyimide (PI) of the display panel 830 may be bent and electrically connected to at least a portion of the FPCB 930. A communication line of the RFIC 840 may be bent and extend to a lateral side (e.g., +X axis direction) of the electronic device 700. Unlike FIG. 9A, the communication line of the RFIC 840 may be formed on the polyimide (PI) layer 950 of the display panel. According to an embodiment, not only the communication line but also the RFIC 840 may be formed on the polyimide layer 950. The RFIC 840 may be electrically connected to at least a portion of the FPCB 930 and the display panel via the communication line. The RFIC 840 may be formed on the polyimide layer 950 of the display panel and electrically connected to an antenna module (e.g., the first antenna 741, the second antenna 742) disposed in the display 760.

The structures of the display module units of FIGS. 9A and 9B are illustrative, and embodiments of the present disclosure are not limited thereto. Hereinafter, for convenience, it is assumed that the electronic device 700 is designed like the display module unit of FIG. 9B.

Figure 10A:
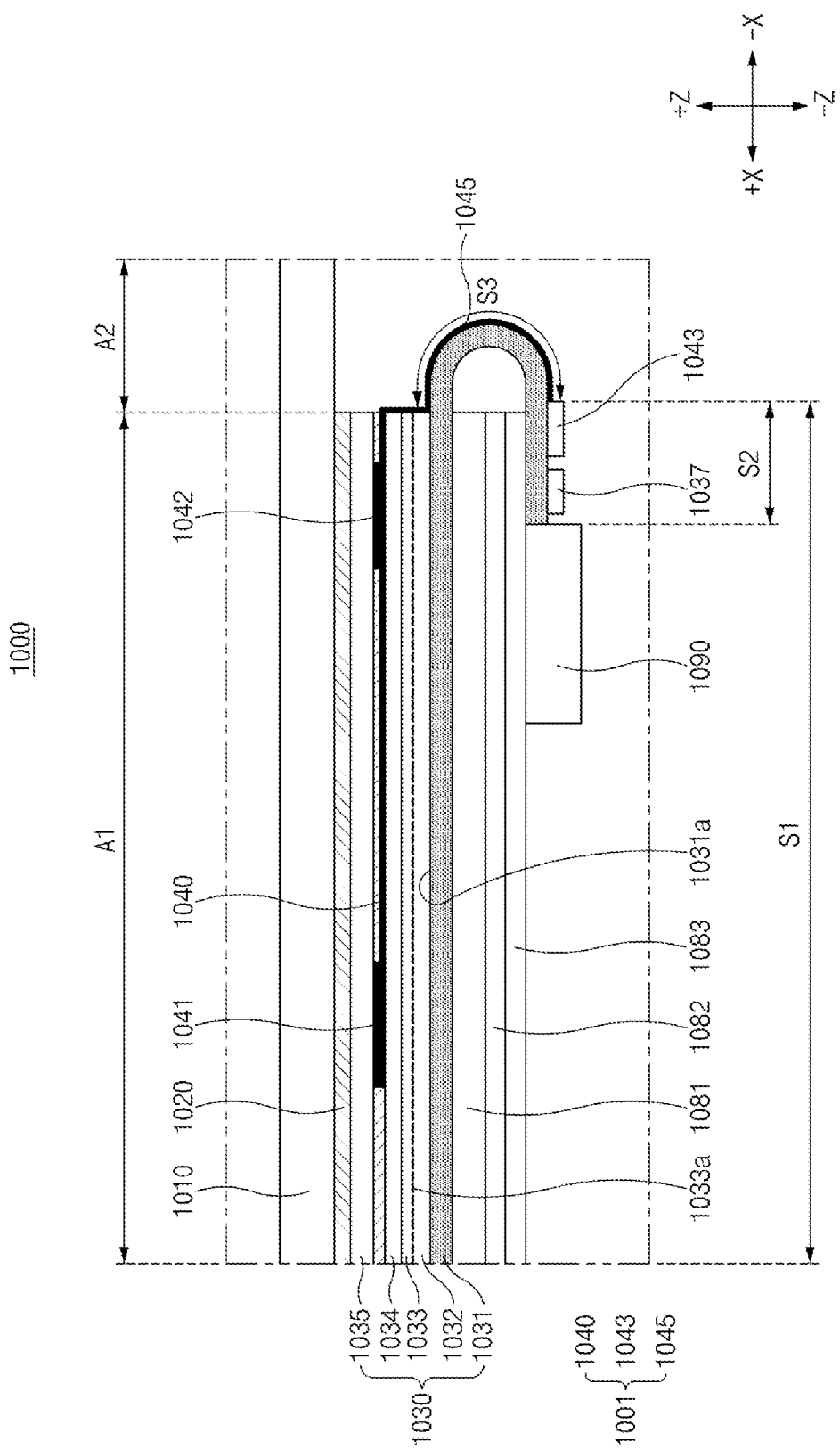
FIGS. 10A, 10B and 10C are cross-sectional views illustrating example antennas and laminate structures of a display assembly according to various embodiments.
Figure 10B:
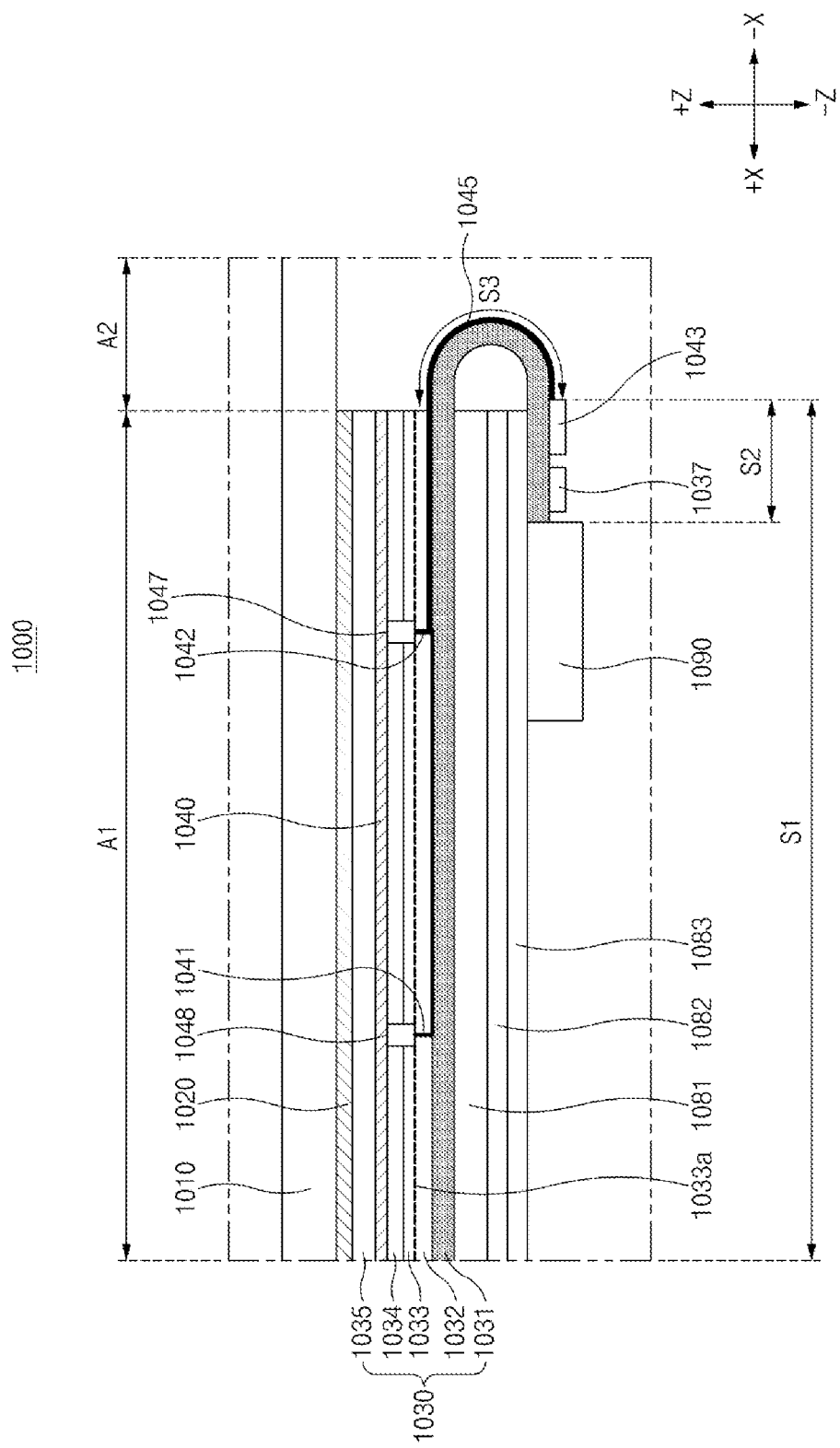
Figure 10C:
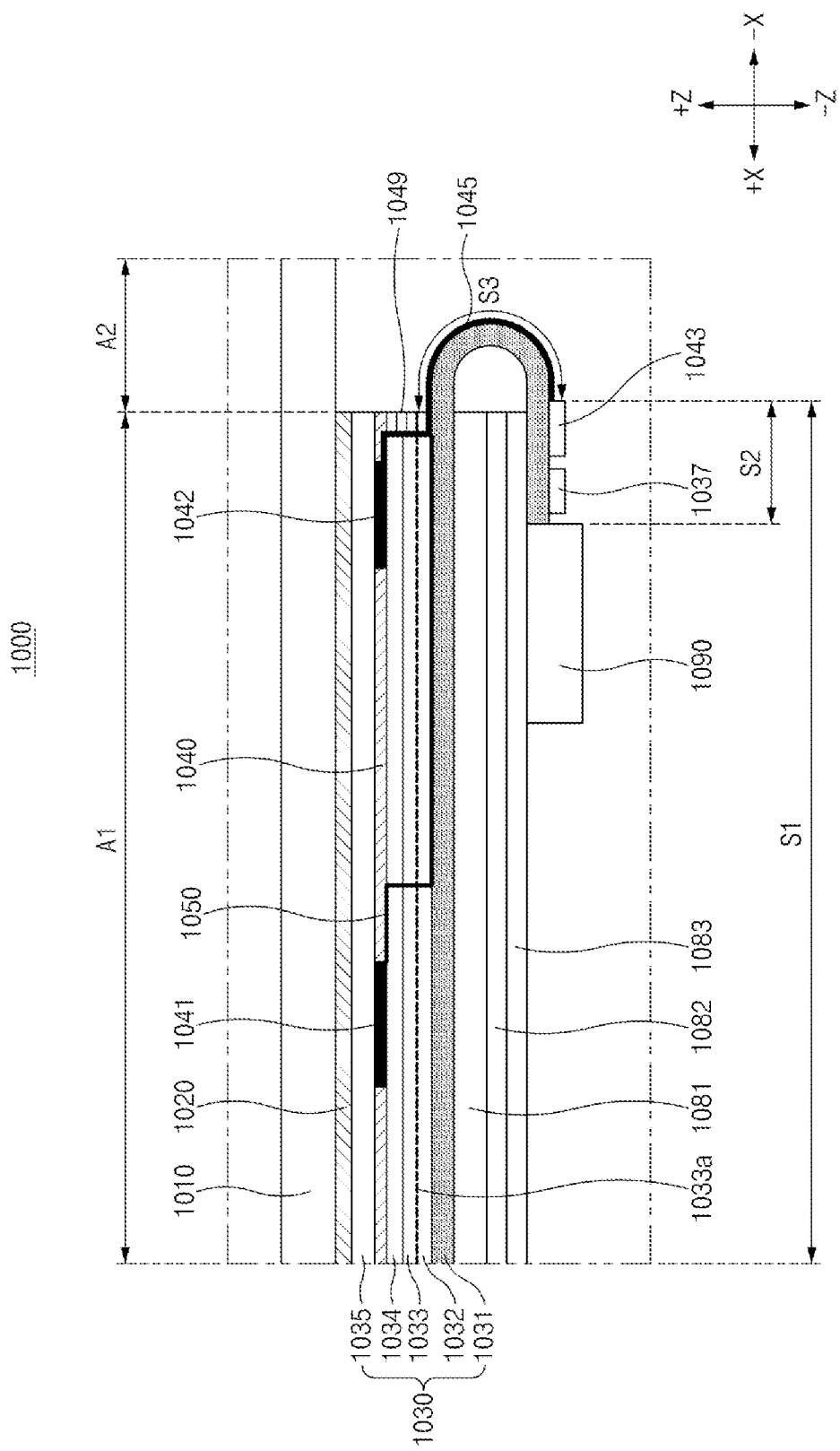

FIGS. 10A, 10B and 10C are cross-sectional views illustrating various example antennas and laminate structures of a display assembly according to various embodiments.

According to an embodiment, the display assembly 1000 may be designed by laminating a plurality of layers. The display assembly 1000 may include a display panel 1030 (e.g., 830 of FIG. 8). FIGS. 10A and 10C illustrate a cross-section (e.g., cross-section taken along a plane including both the X and Z axes in FIG. 7A) of the display assembly 1000 when the electronic device 700 is in a rolled state (e.g., the rolled state 701 of FIG. 7A). The structure of the display assembly 1000 illustrated in FIGS. 10A to 10C is an example for describing antennas and antenna layers arranged in the display, and may be differently designed in practice. For example, it may be understood that a configuration for changing a form of an electronic device is omitted in the display assembly 1000 illustrated in FIGS. 10A to 10C. For another example, the display assembly 1000 of FIGS. 10A and 10B may not include a bending region S3. In this case, each layer of the display assembly 1000 may be designed to be flat. Each layer may be aligned and laminated in one direction.

Referring to FIG. 10A, the display assembly 1000 may include a transparent member 1010, a display substrate 1031 (e.g., board), which is disposed under the transparent member 1010 and at least partially bent, a display element layer 1033 disposed on or above the display substrate 1031, antenna arrays 1041 and 1041 disposed on or above the display substrate 1031, and a communication line 1045, which is at least partially disposed in a bent region of the display substrate 1031 and electrically connected to the antenna arrays 1041 and 1042 (e.g., the first antenna 741 and the second antenna 742 of FIG. 7A). The display assembly 1000 may further include an RFIC 1043 electrically connected to the antenna arrays 1041 and 1042 via the communication line 1045.

According to an embodiment, the display assembly 1000 may include the display substrate 1031 including a first region S1, the bending region S3, and a second region S2, the display element layer 1033 disposed on or above the first region S1, and an antenna structure 1001 disposed on or above the display substrate 1031, wherein the antenna structure 1001 may include the antenna arrays 1041 and 1042 disposed on or above the first region S1, the RFIC 1043 disposed on the second region S2, and the communication line 1045, which is at least partially positioned along the bending region S3 and electrically connects the antenna arrays 1041 and 1042 and the RFIC 1043.

According to an embodiment, the transparent member 1010 may include a first face oriented in the +Z axis direction, a second face oriented in the −Z axis direction, and a side face oriented in the +Y axis direction or −Y axis direction.

According to various embodiments, the display panel 1030 may include an optical layer 1035, the display element layer 1033, a TFT layer 1032, and the display substrate 1031. For example, the display panel 1030 may be exposed to a first face (e.g., front side) through the transparent member 1010, and may include the display element layer 1033 (e.g., (active) organic light emitting diode) including at least one pixel 1033a and the TFT layer 1032 connected to the display element layer 1033. According to an embodiment, an optical member and/or touch sensor layer 1034 may be mounted between the transparent member 1010 and the display element layer 1033 or in the display element layer 1033. For example, the display panel 1030 may be used as an output device for outputting a screen and an input device having a touch screen function. The display substrate 1031 may be disposed on a rear side of the display element layer 1033.

According to an embodiment, the display element layer 1033 may include an encapsulation member (not shown) for covering and protecting light emitting elements (e.g., at least one pixel 1033a) formed on the display substrate 1031.

According to an embodiment, the optical layer 1035 may be disposed between the transparent member 1010 and the display substrate 1031. The optical layer 1035, which transmits a screen output from the display element layer 1033, may be laminated on the display element layer 1033 as at least one layer.

According to various embodiments, a dielectric layer 1020 may be disposed between the transparent member 1010 and the display panel 1030. The dielectric layer 1020 may be disposed in contact with the transparent member 1010. The dielectric layer 1020 may be provided to bond the transparent member 1010 and/or the optical layer 1035 or have a different refractive index from that of the transparent member 1010 and/or the optical layer 1035.

According to various embodiments, the display assembly 1000 may include the display substrate 1031. The display substrate 1031 may be formed of a transparent insulating board such as a glass or polymer film, and, when the display substrate 1031 is formed of a polymer film, the display substrate 1031 may include a flexible board (e.g., FPCB).

According to an embodiment, the second region S2 of the display substrate 1031 may be configured to form a flat face, and the RFIC 1043 may be disposed on at least a portion thereof. For example, the antenna arrays 1041 and 1042 may be disposed on a first face 1031a of the first region S1, and the RFIC 1043 electrically connected to the antenna arrays 1041 and 1042 may be disposed on the first face 1031a of the second region S2. For another example, the antenna arrays 1041 and 1042 and the RFIC 1043 may be disposed facing each other with the display substrate 1031 therebetween.

According to an embodiment, the communication line 1045 may be disposed in the bending region S3 of the display substrate 1031. For example, the communication line 1045 formed on the display substrate 1031 may be bent over the bending region S3 from the first region S1 and extend to the second region S2. The communication line 1045 may electrically connect the antenna arrays 1041 and 1042 and the RFIC 1043.

According to an embodiment, a DDI 1037 (e.g., the DDI 850 of FIG. 8) and/or a touch sensor panel IC (TSP-IC) may be disposed on the first face 1031a of the second region S2 of the display substrate 1031. Furthermore, the communication line 1045 connected to the DDI 1037 and/or a signal line connected to the touch sensor panel IC may be arranged in the bending region S3. The communication line 1045 and the signal line may be connected to a connector disposed adjacent to the display substrate 1031, wherein the connector may be connected to a main circuit board (e.g., 810 of FIG. 8). The DDI 1037 may be electrically connected to a processor (e.g., the AP 860 of FIG. 8) of the main circuit board 810, and the processor 860 may interoperate with the DDI 1037 to receive and process image data or image information including an image control signal corresponding to an instruction for controlling the image data to display visual information (e.g., text, image, or icon) via the display panel 1030.

According to an embodiment, the antenna layer 1040 may include the antenna arrays 1041 and 1042, and the antenna arrays 1041 and 1042 may be arranged on the display substrate 1031. For example, the antenna layer 1040 may be arranged between the optical layer 1035 and the touch sensor layer 1034, and may include the antenna arrays 1041 and 1042 and surrounding regions thereof. However, a position of the antenna layer 1040 is not limited thereto, and the antenna layer 1040 may be arranged on the optical layer 1035 or under the touch sensor layer 1034.

According to an embodiment, the antenna arrays 1041 and 1042 may include at least one radiation conductor, and may be formed on or above the first face 1031a of the display substrate 1031. The radiation conductor(s), for example, may include a patch-type radiation conductor or a dipole-structure radiation conductor extending in one direction. When the radiation conductor(s) is (are) provided in plurality, the plurality of radiation conductors may form an antenna array by being arrayed in a specified form. A distance between the plurality of radiation conductors may be ¼ or more of a wavelength λ of a use frequency of an antenna.

According to an embodiment, the plurality of radiation conductors are arranged on the first face 1031a of the display substrate 1031 and protrude to a certain thickness, but are not limited thereto and may be formed as a thin plate on the first face 1031a or arranged in an open board so as not to protrude to an outer surface of the board. According to an embodiment, the plurality of radiation conductors may be electrically connected to a feeding portion of the main circuit board 810 to transmit/receive a high frequency signal in at least one frequency band. For example, the feeding portion may be electrically connected to the plurality of radiation conductors and supply a high frequency signal (radio frequency (RF) signal) by applying a signal current, or may receive another high frequency signal received through the radiation conductors.

According to an embodiment, the RFIC 1043 may be arranged on the display substrate 1031. For example, the display substrate 1031 may include a base substrate including polyimide (PI) or a flexible circuit substrate 1090 extending from the base substrate. According to an embodiment, a chip (e.g., integrated circuit chip) in which a portion of the RFIC 1043 is implemented may be arranged on one side of a region in which the radiation conductor(s) is (are) arranged or on a face oriented in an opposite direction to a face on which the radiation conductor is arranged. For example, the chip may be formed on the first face 1031a of the second region S2.

According to an embodiment, the RFIC 1043 may receive a communication signal via an RF transceiver or may transmit a received communication signal to the RF transceiver. For example, while being controlled by a processor (e.g., the AP 860 of FIG. 8), the RFIC 1043 may perform wireless communication using the radiation conductor(s). In an embodiment, the RFIC 1043 may receive a control signal and power from a processor (e.g., the CP 870 of FIG. 8) and a power management module (e.g., the power management module 188 of FIG. 1) and process a communication signal received from the outside or a communication signal to be externally transmitted. For example, the RFIC 1043 may include a switch circuit for separating transmission/reception signals, and various amplifiers, filter circuits, and phase shifters for increasing quality of transmission/reception signals.

According to an embodiment, if the plurality of radiation conductors form an antenna array, the RFIC 1043 may include a phase shifter connected to each radiation conductor so as to control an orientation of the antenna structure 1001, for example, the electronic device. For example, if the antenna structure 1001 includes an antenna array, the RFIC 1043 may control directivity of the communication device or an electronic device (e.g., the electronic device 101 of FIG. 1) in which the communication device is mounted by providing a phase difference feed to each radiation conductor. This phase difference feed may be useful for securing an optimal communication environment or good communication environment in a communication scheme having strong straightness, such as millimeter wave communication (e.g., wireless communication using a frequency band of 10 GHz to 300 GHz).

According to an embodiment, one end of the communication line 1045 may be connected to the antenna arrays 1041 and 1042 of the antenna layer 1040 and the other end may be connected to the RFIC 1043. For example, the communication line 1045 (power supply line and/or signal line (e.g., RF signal line)) supplied to the RFIC 1043 may be bent along the bent display substrate 1031 and connected to the antenna arrays 1041 and 1042. For another example, the communication line 1045, in order to be connected to the antenna layer 1040, may be coated along a side of the display panel 1030 and electrically connected to the antenna arrays 1041 and 1042 along an upper surface or lower surface of the antenna layer 1040. However, an embodiment is not limited thereto, and the antenna arrays 1041 and 1042 and the RFIC 1043 may be connected by a via hole in addition to the communication line 1045 or by being coupled to transmit/receive a communication signal.

According to an embodiment, the communication line 1045 may be connected to the RFIC 1043 and/or connector (not shown) arranged on the first face 1031a of the display substrate 1031. The connector may be connected to a connector (not shown) provided to the main circuit board 810 to establish a line for transferring power or a communication signal.

According to various embodiments, a polymer layer 1081, a light shielding member 1082, and/or a heat dissipation layer 1083 may be sequentially arranged under the display substrate 1031. The light shielding member 1082 may be provided as a layer for shielding a rear side of the display assembly 1000, and the heat dissipation layer 1083 may block heat generated in the display substrate 1031 or block heat generated from the RFIC 1043 so as not to deliver the heat to the display panel 1030.

Referring to FIG. 10B, the display assembly 1000 may include the transparent member 1010, the display substrate 1031, which is disposed under the transparent member 1010 and at least partially bent, the display element layer 1033 disposed on or above the display substrate 1031, the antenna arrays 1041 and 1041 disposed on or above the display substrate 1031, and the communication line 1045, which is at least partially disposed in a bent region of the display substrate 1031 and electrically connected to the antenna arrays 1041 and 1042. The display assembly 1000 may further include the RFIC 1043 electrically connected to the antenna arrays 1041 and 1042 via the communication line 1045.

The display assembly 1000 of FIG. 10B may be partially or entirely the same as the structures of the display device 160 of FIG. 1 and the display 760 of FIG. 7A. The configurations of the transparent member 1010, the display element layer 1033, the display substrate 1031, the antenna arrays 1041 and 1042, and the RFIC 1043 of FIG. 10A may correspondingly apply in the configurations of the transparent member 1010, the display element layer 1033, the display substrate 1031, the antenna arrays 1041 and 1042, and the RFIC 1043 of FIG. 10B.

Hereinafter, the display assembly 1000 of FIG. 10B will be described with a focus on differences with the display assembly 1000 of FIG. 10A.

According to various embodiments, in the display assembly 1000, the dielectric layer 1020, a display panel (e.g., optical layer 1035, touch sensor layer 1034, display element layer 1033, TFT layer 1032, display substrate 1031), the polymer layer 1081, the light shielding member 1082, and/or the heat dissipation layer 1083 may be arranged sequentially with respect to the transparent member 1010. For another example, in the display assembly 1000, the flexible circuit substrate 1090 and the second region S2 of the display substrate 1031 may be arranged under at least a partial region of the heat dissipation layer 1083, and the RFIC 1043 and a display driver IC (e.g., DDI 1037) may be arranged in the second region S2 of the display substrate 1031.

According to various embodiments, the antenna arrays 1041 and 1042 may be arranged in at least a partial region of the display panel 1030. The antenna arrays 1041 and 1042 may be provided in a pattern form sharing at least a portion of the TFT layer 1032 and/or display element layer 1033. For example, the antenna arrays 1041 and 1042 may be positioned on or in the TFT layer 1032 and may be arranged so as not to overlap lines for the touch sensor layer 1034 and at least one pixel 1033a of the display element layer 1033. In the display element layer 1033 and/or the touch sensor layer 1034 facing the antenna arrays 1041 and 1042, slits (or openings or holes) 1047 and 1048 may be formed so as to avoid interference from at least one pixel 1034a and/or signal lines.

According to an embodiment, the communication line 1045 (power supply line and/or signal line (e.g., RF signal line)) supplied to the RFIC 1043 may be bent along the bent display substrate 1031 and connected to the antenna arrays 1041 and 1042. For example, the communication line 1045 may be connected to the antenna arrays 1041 and 1042 positioned on or in the TFT layer 1032, and arranged on one surface of polyimide (PI) along the bending region S3 of the display substrate 1031, and connected to the RFIC 1043 oriented in the −Z axis direction, thereby establishing a line for transferring power or a communication signal.

Referring to FIG. 10C, the display assembly 1000 of FIG. 10C may be partially or entirely the same as the structures of the display device 160 of FIG. 1 and the display 760 of FIG. 7A. The configurations of the transparent member 1010, the display element layer 1033, the display substrate 1031, the antenna arrays 1041 and 1042, and the RFIC 1043 of FIG. 10A may correspondingly apply in the configurations of the transparent member 1010, the display element layer 1033, the display substrate 1031, the antenna arrays 1041 and 1042, and the RFIC 1043 of FIG. 10C.

Hereinafter, the display assembly 1000 of FIG. 10C will be described with a focus on differences with the display assembly 1000 of FIG. 10A.

According to various embodiments, in the display assembly 1000, the dielectric layer 1020, a display panel (e.g., optical layer 1035, touch sensor layer 1034, display element layer 1033, TFT layer 1032, display substrate 1031), the polymer layer 1081, the light shielding member 1082, and/or the heat dissipation layer 1083 may be arranged sequentially with respect to the transparent member 1010. For another example, in the display assembly 1000, the flexible circuit substrate 1090 and the second region S2 of the display substrate 1031 may be arranged under at least a partial region of the heat dissipation layer 1083, and the RFIC 1043 and the DDI 1037 may be arranged in the second region S2 of the display substrate.

According to various embodiments, the antenna layer 1040 including the antenna arrays 1041 and 1042 may be arranged in at least a partial region of the display panel 1030. The antenna layer 1040 may be arranged between the optical layer 1035 and the touch sensor layer 1034. The antenna arrays 1041 and 1042 may include at least one radiation conductor, and may be spaced apart from the first face 1031a of the display substrate 1031. The radiation conductor(s), for example, may include a patch-type radiation conductor. When the radiation conductor(s) is (are) provided in plurality, the plurality of radiation conductors may form an antenna array by being arrayed in a specified form.

According to an embodiment, the communication line 1045 (power supply line and/or signal line (e.g., RF signal line)) supplied to the RFIC 1043 may be connected through at least one conductive via 1049 and 1050 penetrating the touch sensor layer 1034, the display element layer 1033, and the TFT layer 1032. For example, the communication line 1045 may extend from the antenna arrays 1041 and 1042 along one surface of the antenna layer 1040 oriented in the −Z axis direction, and may be connected through the conductive vias 1049 and 1050 to the first face 1031a of the display substrate 1031 oriented in the +Z axis direction. The communication line 1045 arranged on the first face 1031a of the display substrate 1031 may be bent along the bending region S3 of the display substrate 1031 and connected to the RFIC 1043, thereby establishing a line for transferring power or a communication signal. However, the communication line 1045 is not limited to a connection through the conductive vias 1049 and 1050, and may feed the antenna arrays 1041 and 1042 from the RFIC 1043 through at least one slit formed in the display substrate 1031 or the TFT layer 1032.

Figure 11A:
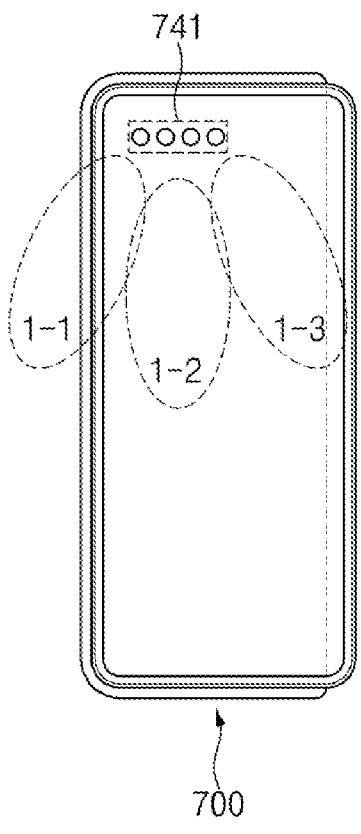
FIGS. 11A, 11B and 11C are diagrams illustrating example beam table operation according to a form change of an electronic device according to various embodiments.
Figure 11A:
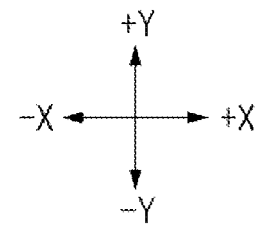
Figure 11B:
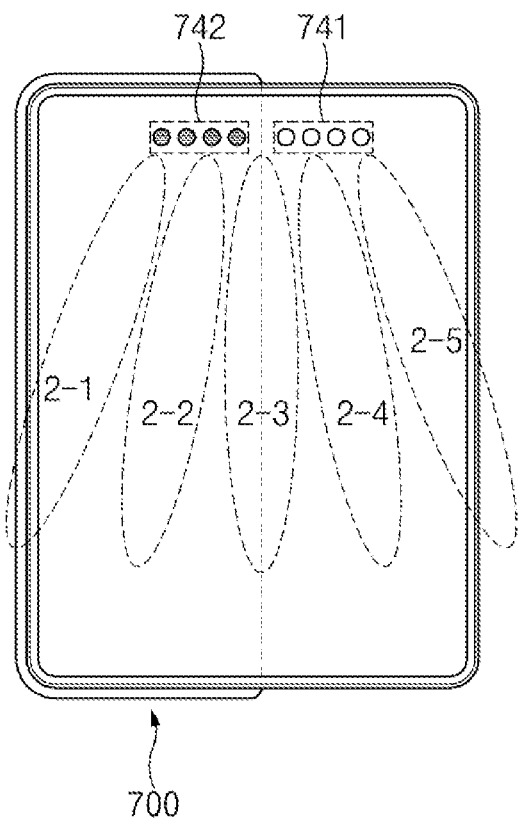
Figure 11B:
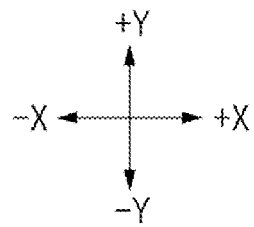
Figure 11C:
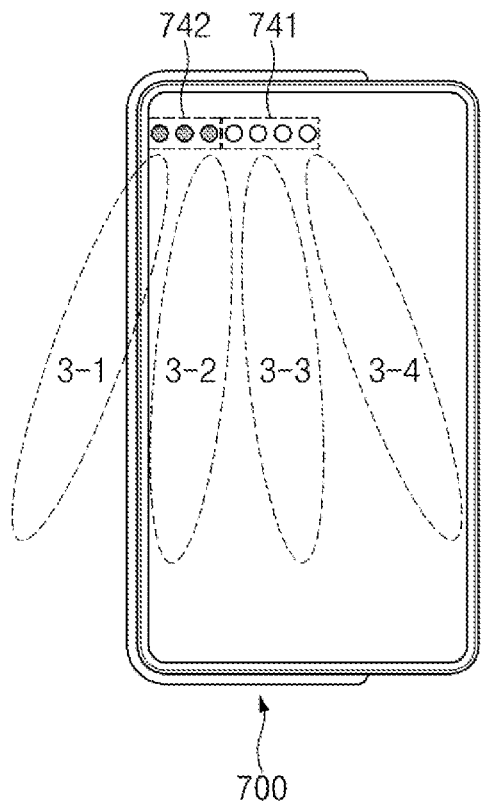
Figure 11C:
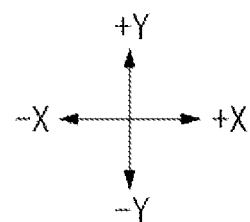

FIGS. 11A, 11B and 11C are diagrams illustrating example beam table operations according to a form change of an electronic device according to various embodiments. The numbers of antenna arrays and antenna elements of the electronic device 700 of FIGS. 11A, 11B and 11C (which may be referred to as FIGS. 11A to 11C) are illustrative, and embodiments of the present disclosure are not limited thereto. For example, the electronic device 700 may include at least two antennas (e.g., the first antenna 741 and second antenna 742 of FIG. 7A).

The electronic device 700 of FIGS. 11A to 11C may perform beamforming based on a beam table. For example, the beam table may include information about beams stored in a memory (e.g., the memory 130 of FIG. 1). The beam table may include beam information for operating antenna modules of the electronic device 700. For example, the beam table may include beam identification information (e.g., beam ID) corresponding to each beam (e.g., beam 1-1, beam 1-2, beam 1-3, beam 2-1, beam 2-2, beam 2-3, beam 2-4, beam 2-5). The beam ID may include a phase shifter (PS) setting value of antenna elements (e.g., the plurality of first antenna elements and the plurality of second antenna elements of FIG. 7A). Each beam ID may have a unique PS setting value. The beam table, for example, may include polarization information (e.g., vertical polarization and/or horizontal polarization) and/or target angle information (vertical plane angle and/or horizontal plane angle) corresponding to each beam identification information. The beam table, for example, may include phase shift information of each antenna element and/or antenna module corresponding to each beam identification information.

According to an embodiment, the electronic device 700 may identify a state (e.g., rolled state 701, first state 703, or a partially extended state) of the electronic device 700 using at least one sensor (e.g., the sensor module 176 of FIG. 1). For example, the electronic device 700 may determine the state of the electronic device 700 using at least one of a sensor positioned on one edge side of the first cover 781, an acceleration sensor positioned in the electronic device 700, a switch (e.g., contact switch) positioned in the electronic device 700, or a magnetic sensor (e.g., hall sensor) positioned in the electronic device 700.

Referring to FIG. 11A, FIG. 11A illustrates example beam patterns when the electronic device 700 is in a rolled state (e.g., the rolled state of FIG. 7A). In the rolled state 701, the first antenna 741 (e.g., the second antenna module 246 of FIG. 2) may be arranged toward a front side of the electronic device 700. Although not illustrated in FIG. 11A, the second antenna 742 (e.g., the second antenna module 246 of FIG. 2) may be arranged on a rear side of the electronic device 700 and covered with at least one of the first cover 781 and/or the second cover 782 of the electronic device 700. The first antenna 741 and the second antenna 742 each may include a plurality of antenna elements (e.g., the first antenna elements and second antenna elements of FIG. 7A). The first antenna 741 and the second antenna 742 may be operatively connected to a communication circuit (e.g., the RFIC 840 of FIG. 8) and a processor (e.g., the CP 870 of FIG. 8).

According to an embodiment, the processor 870 may perform beamforming based on a first beam table. For example, in the rolled state 701, the processor 870 may perform beamforming by forming a plurality of directional beams (beam 1-1, beam 1-2, beam 1-3) using the first antenna 741. The first beam table may include a value for beams (beam 1-1, beam 1-2, beam 1-3) associated with the first antenna 741. For example, the first beam table may include polarization information (e.g., vertical polarization and/or horizontal polarization) and/or target angle information (vertical plane angle and/or horizontal plane angle) corresponding to each beam identification information. The first beam table, for example, may include phase shift information of each antenna element (e.g., first antenna elements) and/or antenna module (e.g., the first antenna 741) corresponding to each beam identification information. In this case, the second antenna 742 that does not participate in forming the plurality of directional beams may be turned off.

Referring to FIG. 11B, FIG. 11B illustrates beam patterns when the electronic device 700 is in a first state (e.g., the first state 703 of FIG. 7A). In the first state 703, the first antenna 741 and the second antenna 742 may be arranged toward the front side of the electronic device 700.

According to an embodiment, in the first state 703, the processor 870 may perform beamforming based on a second beam table. The second beam table may be different from the first beam table. The number of antenna elements used in the first beam table and the number of antenna elements used in the second beam table may be different from each other. In an example, the second beam table may include information of beams that may be formed using the first antenna 741 and the second antenna 742 as one array antenna. In the first state 703, the processor 870 may perform beamforming by forming a plurality of directional beams (beam 2-1, beam 2-2, beam 2-3, beam 2-4, beam 2-5) using at least a portion of the first antenna 741 and the second antenna 742. The second beam table may include a value for beams (beam 2-1, beam 2-2, beam 2-3, beam 2-4, beam 2-5) associated with the first antenna 741 and the second antenna 742. For example, the second beam table may include polarization information (e.g., vertical polarization and/or horizontal polarization) and/or target angle information (vertical plane angle and/or horizontal plane angle) corresponding to each beam identification information. The second beam table, for example, may include phase shift information or phase information of each antenna element (e.g., first antenna elements and second antenna elements) and/or antenna module (e.g., the first antenna 741 and the second antenna 742) corresponding to each beam identification information.

In the first state 703, a form of a beam may be sharper and transmission intensity of each beam may increase in comparison with the rolled state 701. The second beam table may include an increased number of beams compared to the first beam table, and may also include an additional value for controlling transmission intensity. For example, in order to control the transmission intensity, the second beam table may deactivate antenna elements of at least a portion of the first antenna 741 or the second antenna 742.

Referring to FIG. 11C, FIG. 11C illustrates beam patterns when the electronic device 700 is in a second state (e.g., the second state). In the second state, the first antenna 741 may be disposed toward the front side of the electronic device 700. In the second state, at least a portion of the second antenna 742 may be disposed toward the front side of the electronic device 700.

According to an embodiment, in the second state, only a portion of the plurality of second antenna elements of the second antenna 742 may be disposed toward the front side of the electronic device 700. For example, a portion of the plurality of second antenna elements included in the second antenna 742 may be disposed toward the front side of the electronic device 700, and the other portion may be disposed toward a lateral side and/or rear side of the electronic device 700. The processor 870 may perform beamforming by forming a plurality of directional beams (beam 3-1, beam 3-2, beam 3-3, beam 3-4) using at least a portion of the plurality of second antenna elements of the second antenna 742 and the first antenna 741. In this case, the processor 870 may perform beamforming based on a third beam table. The third beam table may be different from the first beam table and the second beam table. The third beam table may include a value for beams (beam 3-1, beam 3-2, beam 3-3, beam 3-4) associated with at least a portion of the plurality of second antenna elements of the second antenna 742 and the first antenna 741. For example, the third beam table may include polarization information (e.g., vertical polarization and/or horizontal polarization) and/or target angle information (vertical plane angle and/or horizontal plane angle) corresponding to each beam identification information. The third beam table, for example, may include phase shift information of each antenna element (e.g., at least a portion of the first antenna elements and second antenna elements) and/or antenna module (e.g., the first antenna 741 and the second antenna 742) corresponding to each beam identification information.

In the second state, a form of a beam may be sharper and transmission intensity of each beam may increase in comparison with the rolled state 701. The third beam table may include an increased number of beams compared to the first table, and may also include an additional value for controlling transmission intensity. For example, in order to control the transmission intensity, the third beam table may deactivate antenna elements of at least a portion of the first antenna 741 or the second antenna 742.

In FIG. 11C, the number of the plurality of second antenna elements of the second antenna disposed on the front side of the electronic device 700 is illustrative, and embodiments of the present disclosure are not limited thereto. The third beam table may be differently configured according to the number of the plurality of second antenna elements disposed on the front side of the electronic device 700. The processor 870 may select the third beam table corresponding to the number of the plurality of second antenna elements disposed on the front side of the electronic device 700. For example, unlike FIG. 11C, two of the antenna elements of the second antenna 742 may be disposed on the front side of the electronic device 700. In this case, the processor 870 may perform beam forming based on the third beam table including a phase shifter (PS) setting value different from that of the third beam table of FIG. 11C.

Figure 12A:
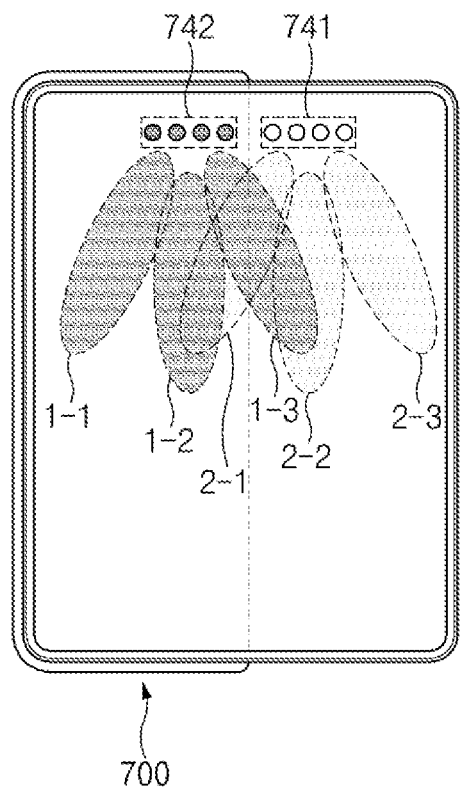
FIG. 12A is a diagram illustrating an example MIMO operation of an electronic device according to various embodiments.
Figure 12A:
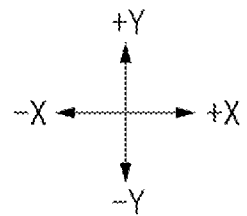

FIG. 12A is a diagram illustrating an example MIMO operation of an electronic device according to various embodiments.

FIG. 12A illustrates beam patterns when the electronic device 700 is in a first state (e.g., the first state 703 of FIG. 7A). The first antenna 741 and the second antenna 742 of the electronic device 700 may form respective beam patterns. For example, the first antenna 741 may form first beam patterns, wherein the first beam patterns may include beams (beam 1-1, beam 1-2, beam 1-3) associated with the first antenna 741. The second antenna 742 may form second beam patterns, wherein the second beam patterns may include beams (beam 2-1, beam 2-2, beam 2-3) associated with the second antenna 742. A portion of beam coverage of the first beam patterns may overlap a portion of beam coverage of the second beam patterns.

According to an embodiment, a processor (e.g., the CP 870 of FIG. 8) may perform beamforming using the first antenna 741 based on a first beam table when the electronic device 700 is in a rolled state (e.g., 701 of FIG. 7A).

According to an embodiment, the processor 870 may perform a multiple input multiple output (MIMO) operation using at least a portion of the first antenna 741 and the second antenna 742 based on a second beam table when the electronic device 700 is in the first state 703. In an example, the second beam table may include information of beams that may be formed using the first antenna 741 and the second antenna 742 as individual array antennas. In this case, the processor 870 may receive data using a plurality of antennas (e.g., the first antenna 741 and the second antenna 742). For example, the processor 870 may receive first data using the first antenna 741 and receive second data using the second antenna 742. For example, the first data and the second data may be construed as data for the same information. The processor 870 may perform a MIMO operation using the first data and the second data. The processor 870 may increase a data reception success rate of the electronic device 700 through the MIMO operation.

According to an embodiment, the first antenna 741 and the second antenna 742 may have different polarization. For example, the polarization of the first antenna 741 and the polarization of the second antenna 742 may be perpendicular to each other. In this case, the processor 870 may perform beamforming based on a beam table (e.g., first beam table) that is the same as before changing a form (e.g., rolled state 701).

Figure 12B:
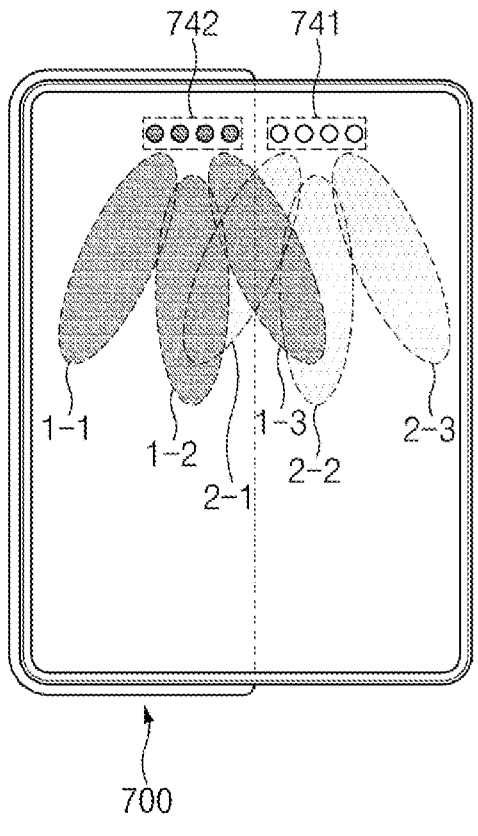
FIG. 12B is a diagram illustrating example CA of an electronic device according to various embodiments.
Figure 12B:
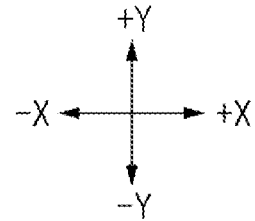

FIG. 12B is a diagram illustrating example CA (carrier aggregation) of an electronic device according to various embodiments.

FIG. 12B illustrates beam patterns when the electronic device 700 is in a first state (e.g., the first state 703 of FIG. 7A). The descriptions related to FIG. 12A may be referenced for beam patterns.

The first antenna 741 and the second antenna 742 of FIG. 12B may transmit/receive a signal of a different frequency band. For example, the first antenna 741 may perform communication using a frequency of 28 GHz band. The second antenna 742 may perform communication using a frequency of 36 GHz band. The first antenna 741 and the second antenna 742 may have a different actual size according to a magnitude of a frequency band that is in use. For example, a size of a patch of the plurality of first antenna elements of the first antenna 741 may be different from a size of a patch of the plurality of second antenna elements of the second antenna 742. In this case, the first antenna 741 and second antenna 742 having a different size may be arranged in one display 760.

According to an embodiment, the processor 870 may perform communication in a frequency band of the first antenna 741 based on a first beam table when the electronic device 700 is in a rolled state (e.g., 701 of FIG. 7A).

According to an embodiment, the processor 870 may perform communication using both frequency bands of the first antenna 741 and the second antenna 742 based on a second beam table when the electronic device 700 is in the first state 703. In an example, the second beam table may include information of beams that may be formed using the first antenna 741 and the second antenna 742 as individual array antennas. For example, the processor 870 may receive first data through the first antenna 741 using a carrier of 28 GHz frequency band and receive second data through the second antenna 742 using a carrier of 36 GHz frequency band. The first data and the second data may be data for different information. The processor may perform CA using the first data and the second data. Since the processor 870 performs CA, the processor 870 may increase data capacity by combining carriers of a plurality of frequency bands.

According to an embodiment, the processor 870 may also perform communication for each of the first antenna 741 and the second antenna 742 without performing CA even when the electronic device 700 is in the first state 703.

Figure 13A:
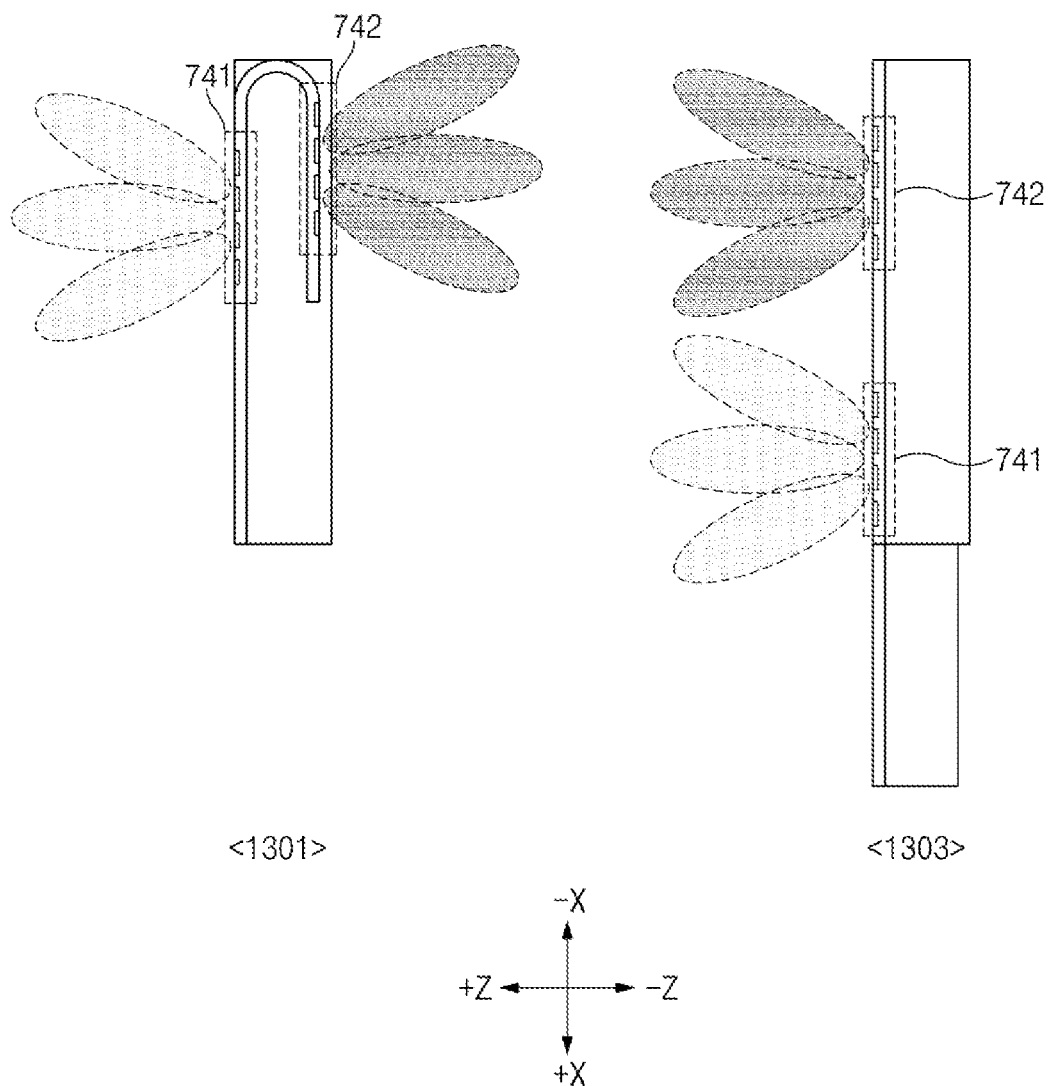
FIGS. 13A and 13B are diagrams illustrating example beam coverage according to a position of a second antenna of an electronic device according to various embodiments.
Figure 13B:
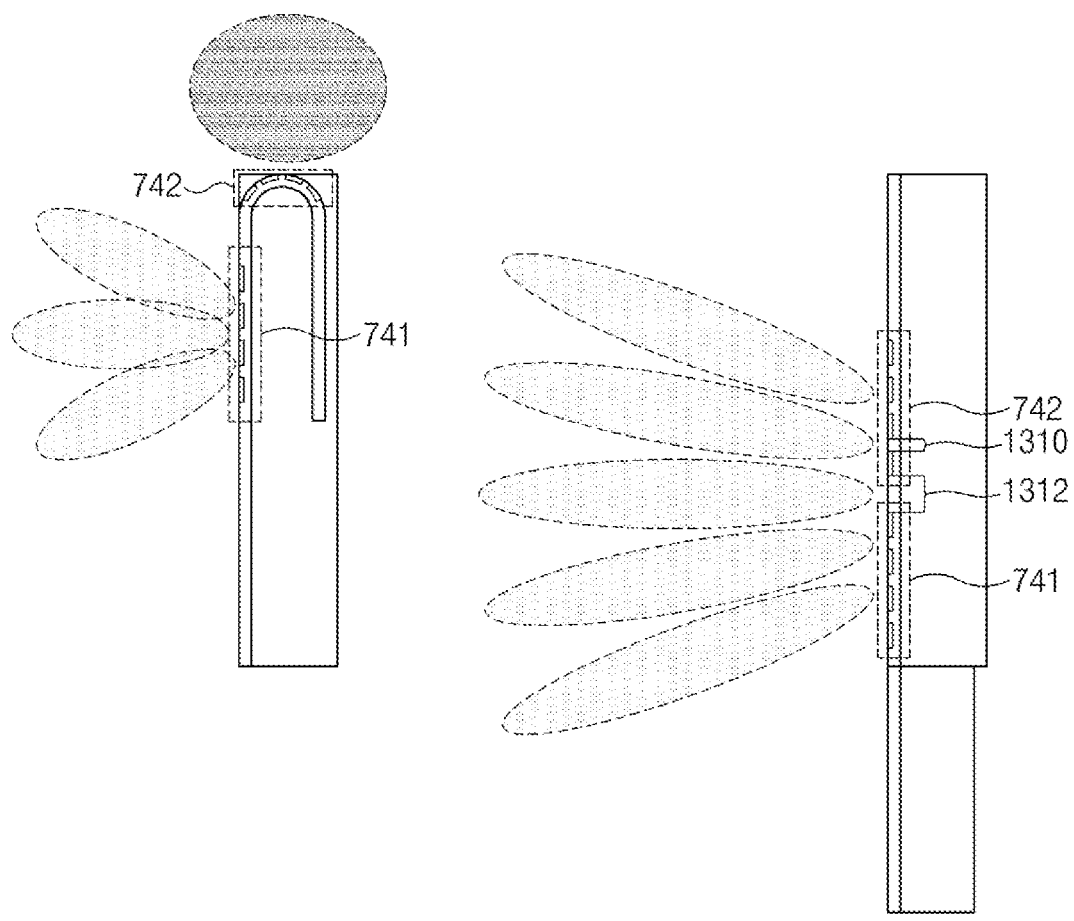

FIGS. 13A and 13B are diagrams illustrating example beam coverage according to a position of a second antenna of an electronic device according to various embodiments.

Referring to FIG. 13A, a state 1301 is viewed from above (+Y axis direction) an electronic device (e.g., the electronic device 700 of FIG. 7A) which is in a rolled state (e.g., the rolled state 701 of FIG. 7A). A state 1303 corresponds to a state where the electronic device 700 is viewed from above the electronic device 700 which is in a first state (e.g., the first state 703 of FIG. 7A).

In the state 1301, at least a portion (e.g., the second display region 760b of FIG. 7A) of the display 760 may be bent and rolled into an edge of one side (−X axis direction) of the electronic device or unrolled from the edge of one side. The second antenna 742 of FIG. 13A may be disposed toward a rear side of the electronic device. The first antenna 741 may have a first beam table for forming first beam patterns directed forwards (+Z axis direction). The second antenna 742 may have a second beam table for forming second beam patterns directed backwards (−Z axis direction). A processor (e.g., the CP 870 of FIG. 8) may perform communication based on the first beam table of the first antenna 741. According to an embodiment, the processor 870 may perform communication based on the second beam table of the second antenna 742. In this case, in order to achieve high communication efficiency, if at least a partial structure (e.g., at least a portion of the first cover 781 or the second cover 782 positioned in the −Z axis direction) in a communication direction (e.g., −Z axis direction) of the second communication antenna 742 is made of metal, glass, or plastic, the at least partial structure may have a hole. If the at least partial structure in the communication direction of the second antenna 742 is made of plastic, the at least partial structure may further include a double-shot injection molded structure.

In the state 1303, the display 760 may expand due to manipulation by a user. The second display region 760b may be disposed toward the front side of the electronic device 700. In this case, the second antenna 742 may be disposed toward the front side (+Z direction) of the electronic device 700. The processor 870 may form third beam patterns directed toward the front side of the electronic device 700 using the first antenna 741 and the second antenna 742 and based on a third beam table.

According to an embodiment, when the first antenna 741 and the second antenna 742 are disposed toward the front side, the processor 870 may deactivate one of the first antenna 741 or the second antenna 742 based on the third beam table.

According to an embodiment, the third beam table may use the first antenna 741 and the second antenna 742 as individual array antennas. The processor 870 may receive first data using the first antenna 741 and receive second data using the second antenna 742. The processor 870 may activate a MIMO operation based on the third beam table. The processor 870 may perform the MIMO operation using the first data and the second data and based on the third beam table. According to an embodiment, the first antenna 741 and the second antenna 742 of the electronic device 700 may be fed so as to transmit/receive a signal using beams having different polarization characteristics. In this case, the processor 870 may perform communication based on the first beam table regardless of whether the MIMO operation is activated.

According to an embodiment, the first antenna 741 and the second antenna 742 of FIG. 12B may transmit/receive a signal of a different frequency band. The processor 870 may receive first data using the first antenna 741 and receive second data using the second antenna 742. The processor 870 may perform CA using the first data and the second data and based on the third beam table.

The descriptions related to FIGS. 12A and 12B may be referenced for execution of the MIMO operation and CA.

Referring to FIG. 13B, a state 1301 is viewed from above (+Y axis direction) an electronic device (e.g., the electronic device 700 of FIG. 7A) which is in a rolled state (e.g., the rolled state 701 of FIG. 7A). A state 1303 corresponds to a state where the electronic device 700 is viewed from above the electronic device 700 which is in a first state (e.g., the first state 703 of FIG. 7A).

In the state 1301, at least a portion (e.g., the second display region 760b of FIG. 7A) of the display 760 may be bent and rolled into an edge of one side (−X axis direction) of the electronic device or unrolled from the edge of one side. The second antenna 742 of FIG. 13A may be disposed toward a lateral side (−X axis direction) of the electronic device. According to an embodiment, the first antenna 741 may have a first beam table for forming first beam patterns directed forwards (−Y axis direction). The second antenna 742 may have a second beam table for forming second beam patterns sidewards (−X axis direction). According to an embodiment, the second antenna 742 may be positioned on a lateral side of the electronic device 700 and may be used to measure antenna performance without forming the second beam patterns. In this case, a processor (e.g., 870 of FIG. 8) may perform communication using the first antenna 741 and based on the first beam table.

In the state 1303, the display 760 may expand due to manipulation by a user. The second display region 760b may be disposed toward the front side of the electronic device 700. In this case, the second antenna 742 may be disposed toward the front side of the electronic device 700. The first antenna 741 and the second antenna 742 may be designed to be spaced apart by d1 1312. Antenna elements of the first antenna 741 and antenna elements of the second antenna 742 may be designed to be spaced apart by d2 1310. d1 1312 and d2 1310 may be designed to be substantially the same. According to an embodiment, d1 1312 and d2 1310 may be designed to be a distance corresponding to ¼ of a frequency wavelength of a signal transmitted/received by the first antenna 741 and the second antenna 742. The descriptions related to FIG. 13A may be referenced for communication performed by the processor 870 in the state 1303.

Figure 14:
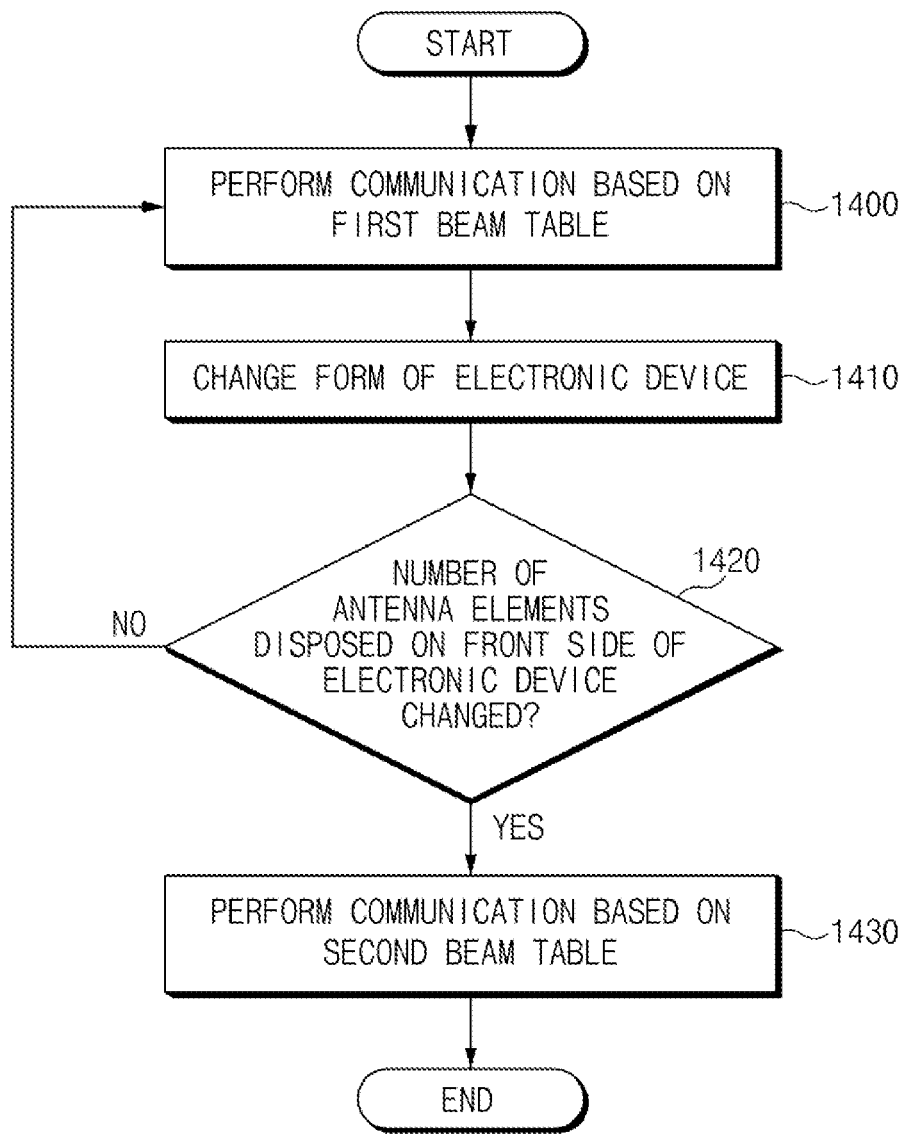
FIG. 14 is a flowchart illustrating an example method of operating a beam table in an electronic device according to various embodiments.

FIG. 14 is a flowchart illustrating an example method of beam table operation of an electronic device according to various embodiments. The descriptions related to FIGS. 7A, 7B, and 13 may be referenced for FIG. 14.

According to an embodiment, in operation 1400, an electronic device (e.g., the electronic device 700 of FIG. 7A) may perform beamforming based on a first beam table. For example, when the electronic device 700 is in the rolled state 701, a processor (e.g., the CP 870 of FIG. 8) may perform beamforming using a first antenna (e.g., the first antenna 741 of FIG. 7A) of the electronic device. In this case, the first beam table may include information about a beam associated with the first antenna 741. For another example, when the electronic device 700 is in the first state 703, the processor 870 may perform beamforming using the first antenna 741 and a second antenna (e.g., the second antenna 742 of FIG. 7A) of the electronic device. In this case, the first beam table may include information about a beam associated with the first antenna 741 and the second antenna 742.

In operation 1410, a form of the electronic device 700 may be changed due to manipulation by a user. For example, the electronic device 700 may be changed by the user from the rolled state 701 to the first state 703 or from the first state 703 to the rolled state 701. The electronic device 700 may detect a change in the form using at least one sensor (e.g., the first sensor module 176 of FIG. 1). For example, the electronic device 700 may detect a change in the form and determine the state of the electronic device 700 using at least one of a sensor positioned on one edge side of a first cover (e.g., 781 of FIG. 7A), an acceleration sensor positioned in the electronic device 700, a switch (e.g., contact switch) positioned in the electronic device 700, or a magnetic sensor positioned in the electronic device 700.

In operation 1420, the processor 870 may identify whether the number of antenna elements (e.g., the plurality of second antenna elements of the second antenna 742) arranged on the front side of the electronic device 700 has been changed due to a change in the form of the electronic device. The processor 870 may use at least one sensor 176 to identify a change in the number of antenna elements arranged on the front side of the electronic device 700. According to an embodiment, the user may slide a second cover (e.g., the second cover 782 of FIG. 7A) of the electronic device 700, which is in the rolled state 701, in the +X direction. In this case, at least a portion of a second display region (e.g., the second display region 760b of FIG. 7B) may be visually exposed to the front side of the electronic device 700, and along this, a portion of the second antenna 742 may be disposed on the front side of the electronic device 700. A degree to which the second antenna 742 is disposed may change according to how much the user slides the second cover 782. The number of the plurality of second antenna elements of the second antenna 742 disposed on the front side of the electronic device 700 may change according to the degree to which the second antenna 742 is disposed. For example, in the case where the second antenna 742 includes four antenna elements, the user may slide the second cover 782 to dispose one antenna element on the front side of the electronic device 700. For another example, the user may further slide the second cover 782 in the +X axis direction to dispose all of the antenna elements of the second antenna 742 on the front side of the electronic device 700. The processor 870 may identify the number of antenna elements disposed on the front side of the electronic device 700 by detecting how much the user slides.

According to an embodiment, if there is no change in the number of antenna elements disposed on the front side of the electronic device 700 even when the form of the electronic device 700 changes (1420—N), the processor 870 may proceed to operation 1400. This case may occur, for example, when the user further slides the second cover 782 in the +X axis direction in a state in which all of the antenna elements of the second antenna 742 are disposed on the front side of the electronic device 700. In this case, the number of antenna elements disposed on the front side of the electronic device 700 may be the same as before the user slides. The processor 870 may proceed to operation 1400 and perform communication based on the first beam table.

According to an embodiment, if the number of antenna elements disposed on the front side of the electronic device 700 changes due to a change in the form of the electronic device 700 (1420—Y), the processor 870 may proceed to operation 1430. This case may occur, for example, when the electronic device 700 is changed by the user from the rolled state 701 to the first state 703. In this case, at least a portion of the second antenna 742 may be disposed on the front side of the electronic device 700. The processor 870 may perform beamforming using at least a portion of the first antenna 741 and the second antenna 742 and based on a second beam table. The processor 870 may select the second beam table according to the number of the plurality of second antenna elements of the second antenna 742 disposed on the front side of the electronic device 700. The second beam table may include information about a beam associated with at least a portion of the first antenna 741 and the second antenna 742. For example, the second beam table may include a phase shifter (PS) setting value corresponding to the number of antenna elements disposed on the front side of the electronic device 700. The processor 870 may form a plurality of directional beams based on the PS setting value of the second beam table. For another example, the second beam table may further include information for deactivating at least a portion of the antenna disposed on the front side of the electronic device 700 in order to adjust intensity of transmission/reception of the electronic device 700. For another example, the second beam table may further include information for allowing the processor to perform a MIMO operation or CA using a plurality of antennas.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first cover;
   a second cover coupled with the first cover and configured to perform a sliding operation;
   a rollable display including a first display region visible in a rolled state and a second display region unrolled in response to the sliding operation of the second cover;
   a first antenna including a plurality of first antenna elements and disposed in the first display region of the rollable display;
   a second antenna including a plurality of second antenna elements and disposed in the second display region of the rollable display; and
   a processor,
   wherein the processor is configured to:
   form a plurality of directional beams using the first antenna based on a first beam table in the rolled state of the rollable display, and
   form a plurality of directional beams using the first antenna and at least a portion of the second antenna elements of the second antenna based on a second beam table based on a size of a visible region of the rollable display increasing from the rolled state.

2. The electronic device of claim 1, wherein a number of second antenna elements disposed on a front side of the electronic device, among the antenna elements of the second antenna, changes according to a change in a size of the second display region visible on the front side of the electronic device.

3. The electronic device of claim 2, wherein the processor is further configured to perform beamforming using the plurality of directional beams formed based on the second beam table.

4. The electronic device of claim 2,
wherein based on the size of the visible region of the rollable display increasing from the rolled state, the processor is further configured to:
receive first data using the first antenna, and
receive second data using at least a portion of the second antenna elements of the second antenna.

5. The electronic device of claim 4, wherein the processor is further configured to perform a multiple input multiple output (MIMO) operation using the first data and the second data.

6. The electronic device of claim 2, wherein the processor is further configured to:
receive first data of a first frequency band using the first antenna, and
receive second data of a second frequency band using the second antenna.

7. The electronic device of claim 6, wherein the processor is further configured to perform carrier aggregation (CA) using the first data and the second data.

8. The electronic device of claim 2,
wherein the processor is further configured to form a plurality of directional beams using the second antenna based on a third beam table in the rolled state of the rollable display,
the second antenna being disposed toward a rear side of the electronic device in the rolled state of the rollable display, and
in the rolled state of the rollable display, the plurality of directional beams formed using the second antenna are configured to be formed in an opposite direction to the plurality of directional beams formed using the first antenna.

9. The electronic device of claim 8,
wherein at least a portion of the first cover or the second cover includes a hole,
wherein the hole corresponds to a direction in which the second antenna is oriented in the rolled state of the rollable display.

10. The electronic device of claim 2, wherein the processor is further configured to measure performance of the second antenna using the second antenna in the rolled state of the rollable display.

11. The electronic device of claim 1,
wherein the second beam table includes a value for controlling transmission intensity of the plurality of directional beams formed using at least a portion of the second antenna, and
wherein the processor is further configured to deactivate at least the portion of the second antenna and the first antenna based on the second beam table.

12. The electronic device of claim 1, wherein based on the size of the visible region of the rollable display increasing from the rolled state, the processor is further configured to deactivate at least a portion of the first antenna and the second antenna.

13. A method of operating an electronic device, the method comprising:
forming a plurality of directional beams using a first antenna based on a first beam table in a rolled state of a rollable display; and
forming a plurality of directional beams using the first antenna and at least a portion of second antenna elements of a second antenna based on a second beam table based on a size of a visible region of the rollable display increasing from the rolled state,
wherein the rollable display includes a first display region visible in the rolled state and a second display region unrolled in response to a sliding operation of a second cover,
wherein the first antenna includes a plurality of first antenna elements and is disposed in the first display region of the rollable display, and
the second antenna includes a plurality of second antenna elements and is disposed in the second display region of the rollable display.

14. The method of claim 13, wherein a number of the second antenna elements disposed on a front side of the electronic device, among the antenna elements of the second antenna, changes according to a change in a size of the second display region visible on the front side of the electronic device.

15. The method of claim 14, further comprising performing beam forming using the plurality of directional beams formed based on the second beam table.

* * * * *